United States Patent
Durojaiye et al.

(10) Patent No.: US 10,216,406 B2
(45) Date of Patent: *Feb. 26, 2019

(54) CLASSIFICATION OF TOUCH INPUT AS BEING UNINTENDED OR INTENDED

(71) Applicant: Microsoft Technology Licensing, LLC, Redmond, WA (US)

(72) Inventors: Olumuyiwa M. Durojaiye, Bothell, WA (US); David Abzarian, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,970

(22) Filed: Dec. 27, 2017

(65) Prior Publication Data

US 2018/0121052 A1 May 3, 2018

Related U.S. Application Data

(63) Continuation of application No. 15/220,295, filed on Jul. 26, 2016, now Pat. No. 9,886,186, which is a
(Continued)

(51) Int. Cl.
*G06F 3/041* (2006.01)
*G06F 3/0488* (2013.01)
*G06F 3/0354* (2013.01)

(52) U.S. Cl.
CPC ........ *G06F 3/0488* (2013.01); *G06F 3/03545* (2013.01); *G06F 3/041* (2013.01);
(Continued)

(58) Field of Classification Search
CPC ...... G06F 3/041; G06F 3/0412; G06F 3/0416; G06F 3/0488; G06F 3/04883;
(Continued)

(56) References Cited

U.S. PATENT DOCUMENTS

| 7,847,789 B2 | 12/2010 | Kolmykov-Zotov et al. |
| 8,370,772 B2 | 2/2013 | Chien et al. |

(Continued)

FOREIGN PATENT DOCUMENTS

| EP | 1659481 A2 | 5/2006 |
| EP | 2474887 A2 | 7/2012 |
| FR | 2979025 A1 | 2/2013 |

OTHER PUBLICATIONS

"Non Final Office Action Issued in U.S. Appl. No. 14/485,573", dated Dec. 11, 2015, 16 Pages.
(Continued)

*Primary Examiner* — Olga V Merkoulova
(74) *Attorney, Agent, or Firm* — Jacob P. Rohwer; Newport IP, LLC

(57) ABSTRACT

The techniques described herein implement a classification process to evaluate information associated with a tool input (e.g., from an input tool such as a pen or a stylus) and a user touch input (e.g., from a finger or a palm of a hand) to determine whether the user touch input is an intended or an unintended touch input. The information evaluated may be associated with an arrival of the tool input relative to an arrival of the user touch input. The information evaluated may also be associated with a movement of the tool input relative to a movement of the user touch input. In various implementations, the techniques may calculate an evaluation score and compare the evaluation score to a confidence classification threshold. If a confident classification cannot be achieved, the techniques further the classification process as more information associated with the inputs is received.

20 Claims, 13 Drawing Sheets

Related U.S. Application Data continuation of application No. 14/485,573, filed on Sep. 12, 2014, now Pat. No. 9,430,085.

(52) U.S. Cl.
CPC .......... *G06F 3/0416* (2013.01); *G06F 3/0418* (2013.01); *G06F 2203/04101* (2013.01); *G06F 2203/04104* (2013.01); *G06F 2203/04808* (2013.01)

(58) Field of Classification Search
CPC ....... G06F 3/04886; G06F 2203/04808; G06F 2203/04104; G06F 3/044
See application file for complete search history.

(56) References Cited

U.S. PATENT DOCUMENTS

| | | | |
|---|---|---|---|
| 8,633,718 B2 | 1/2014 | Yeh et al. | |
| 2006/0012580 A1 | 1/2006 | Perski et al. | |
| 2006/0227116 A1* | 10/2006 | Zotov | G06F 3/0418 345/173 |
| 2008/0158185 A1 | 7/2008 | Westerman | |
| 2009/0091540 A1 | 4/2009 | Doan et al. | |
| 2011/0012855 A1 | 1/2011 | Yeh et al. | |
| 2011/0115730 A1 | 5/2011 | Kim et al. | |
| 2011/0148770 A1 | 6/2011 | Adamson et al. | |
| 2012/0158629 A1 | 6/2012 | Hinckley et al. | |
| 2012/0169663 A1 | 7/2012 | Kim et al. | |
| 2012/0188183 A1 | 7/2012 | Heo et al. | |
| 2012/0262407 A1 | 10/2012 | Hinckley et al. | |
| 2013/0044070 A1 | 2/2013 | Townsend et al. | |
| 2013/0127833 A1* | 5/2013 | Davidson | G06F 3/04815 345/419 |
| 2013/0222294 A1 | 8/2013 | Choi et al. | |
| 2013/0265269 A1 | 10/2013 | Sharma et al. | |
| 2013/0300696 A1* | 11/2013 | Haran | G06F 3/041 345/173 |
| 2013/0328832 A1 | 12/2013 | Boumgarten | |
| 2014/0028554 A1 | 1/2014 | De los Reyes et al. | |
| 2014/0082545 A1* | 3/2014 | Zhai | G06F 3/04886 715/773 |
| 2014/0104191 A1* | 4/2014 | Davidson | G06F 3/04883 345/173 |
| 2014/0111462 A1 | 4/2014 | Townsend et al. | |
| 2014/0204035 A1 | 7/2014 | Chang | |
| 2016/0077650 A1 | 3/2016 | Durojaiye et al. | |

OTHER PUBLICATIONS

"Notice of Allowance Issued in U.S. Appl. No. 14/485,573", dated Apr. 26, 2016, 9 Pages.

"Non Final Office Action Issued in U.S. Appl. No. 15/220,295", dated May 1, 2017, 14 Pages.

"Notice of Allowance Issued in U.S. Appl. No. 15/220,295", dated Sep. 28, 2017, 13 Pages.

"International Preliminary Report on Patentability Issued in PCT Application No. PCT/US2015/049544", dated Dec. 7, 2016, 9 Pages.

"International Search Report & Written Opinion Issued in PCT Application No. PCT/US2015/049544", dated Nov. 23, 2015, 19 Pages.

"Second Written Opinion Issued in PCT Application No. PCT/US2015/049544", dated Aug. 17, 2016, 8 Pages.

Schwarz, et al., "Probabilistic Palm Rejection Using Spatiotemporal Touch Features and Iterative Classification", In Proceedings of SIGCHI Conference on Human Factors in Computing Systems, Apr. 26, 2014, pp. 2009-2012.

\* cited by examiner

CLASSIFICATION OF TOUCH INPUT AS BEING UNINTENDED OR INTENDED

PRIORITY APPLICATION

This patent application is a continuation application of, and claims priority to, co-pending, commonly owned U.S. patent application Ser. No. 15/220,295, entitled "CLASSIFICATION OF TOUCH INPUT AS BEING UNINTENDED OR INTENDED", filed on Jul. 26, 2016, which is incorporated herein by reference in its entirety. U.S. patent application Ser. No. 15/220,295 is a continuation application of, and claims priority to, U.S. patent application Ser. No. 14/485,573, entitled "CLASSIFICATION OF TOUCH INPUT AS BEING UNINTENDED OR INTENDED", filed on Sep. 12, 2014 and issued as U.S. Pat. No. 9,430,085 on Aug. 30, 2016, which is also incorporated herein by reference in its entirety.

BACKGROUND

Many computing devices utilize touch surfaces, such as touch pads and touch screens. These touch surfaces may be configured to receive input from an input tool (e.g., a pen, a stylus, other input objects, etc.) as well as user touch input (e.g., finger input). When using the input tool, e.g., to write a message on the touch surface, a user may inadvertently contact a touch surface (e.g., rest his or her palm on the touch surface).

SUMMARY

This disclosure describes techniques for implementing a classification process to evaluate information associated with an input from an input tool, such as a pen or a stylus, and a touch input from a user, such as a finger or a palm of a user's hand, to determine whether the touch input from the user is an intended touch input or an unintended touch input. The information evaluated may be associated with an arrival of the input from the input tool relative to an arrival of the touch input from the user. The information evaluated may also be associated with a movement of the input from the input tool relative to a movement of the touch input from the user.

In various implementations, the techniques may calculate an evaluation score and compare the evaluation score to a confidence classification threshold. If a confident classification cannot be achieved, the techniques further the classification process as more information associated with the inputs is received.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
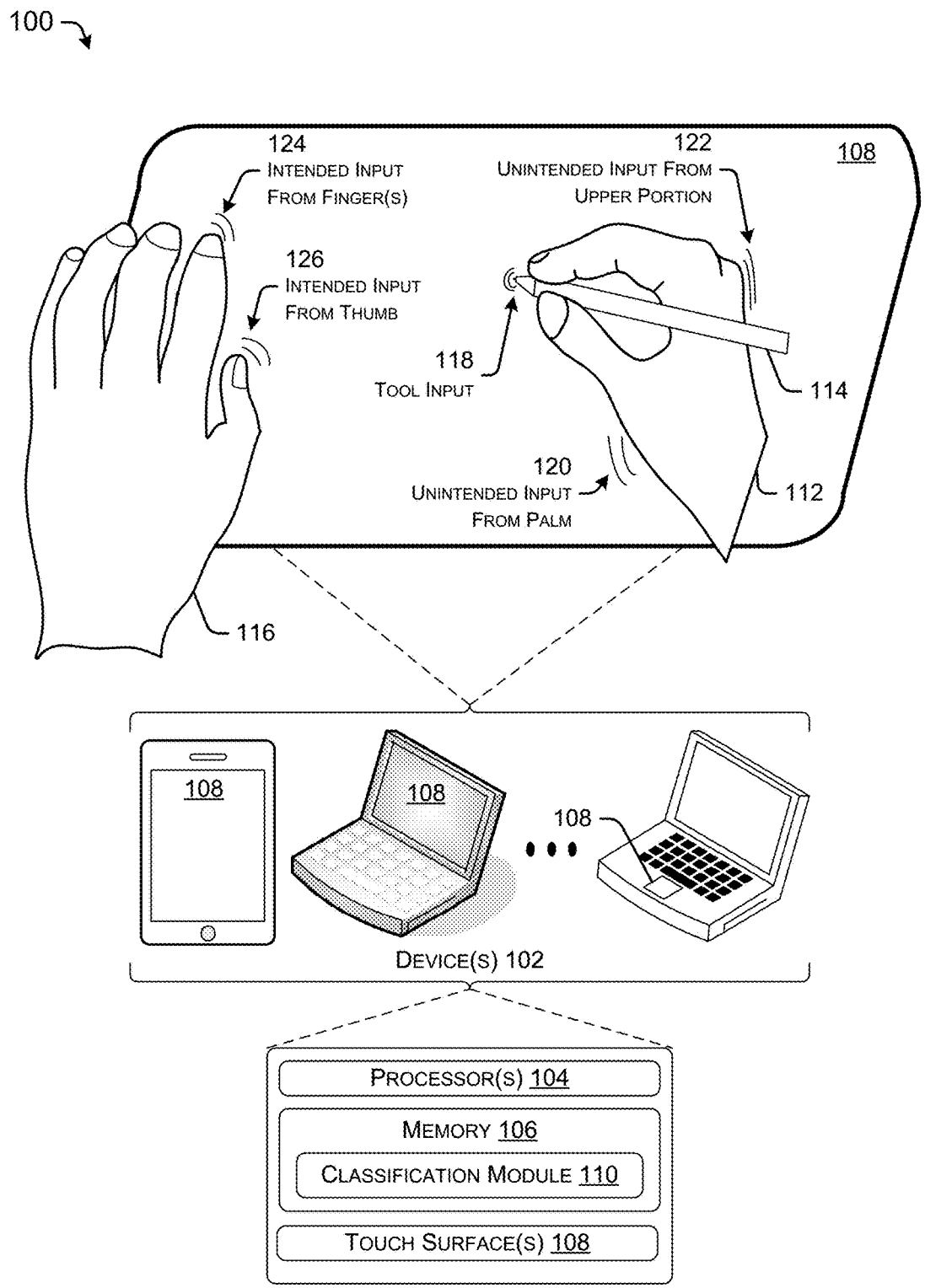
FIG. 1 illustrates an example environment in which a device can classify a touch input as being either an unintended touch input or an intended touch input.

This disclosure describes techniques for classifying a touch input (e.g., a touch contact) as being either an unintended touch input or an intended touch input. The classification may occur while a user of the device is simultaneously providing (i) input via an input tool such as a pen, a stylus or another non-user object (this may be referred to herein as tool input), and (ii) input via a user such as a finger or a palm (this may be referred to herein as user touch input).

In various implementations, a device and/or a touch surface are/is configured to distinguish a tool input from a user touch input so that the techniques can classify the user touch input as either being unintended or intended. In some examples, an input tool may be an active input tool (e.g., an active pen) such that it generates a signal that is detectable by the touch surface, where the signal may be used by the device and/or a touch surface to distinguish tool input from user touch input. To determine that an input tool is an "active" input tool, the touch surface may detect actual contact of the active input tool on the touch surface and/or detect when the active input tool is in range of the touch surface (e.g., located within a particular proximity to the touch surface). Moreover, the touch surface may determine that the input tool is an active input tool based on other input, e.g., recent contact from an active input tool or a recent user touch operation to indicate future use of an active input tool.

An active input tool may include a conductive tip, a sensor, processing capabilities and/or storage capabilities. For example, the active input tool may include a sensor and an Application-Specific Integrated Circuit (ASIC) or another component that provides information about location and/or pressure of contact to the touch surface. An active input tool may also include buttons to cause operations to be performed, such as a button to erase content, a button to perform left-click or right-click operations of a mouse and so on. An active input tool may also include a battery or other power source.

Further, in some examples, characteristics of an input such as an area and/or pressure of contact may be analyzed to determine if the input satisfies one or more criteria (e.g., has less than a predetermined contact area, has a predetermined contact shape, is associated with a particular amount of pressure on the touch surface, etc.). If the one or more criteria are satisfied, then the input may be determined to be tool input, instead of user touch input from a user's hand. This may allow tool input to be detected and/or identified for various types of non-user objects, such as a passive stylus or a passive pen (e.g., one that does not generate a detectable signal).

The techniques described herein classify user touch input or touch input other than the input provided via the input tool. For example, the techniques may classify a touch input provided by a palm of a hand as an unintended touch input (e.g., a user's strong hand or writing hand that is holding the input tool). In another example, the techniques may classify a touch input provided by a "resting" finger as an unintended touch input (e.g., the user may have a habit of resting or placing a finger on the touch surface with no intention of using the finger to provide useful input). In yet another example, the techniques may classify a touch input provided by the opposite, or weaker, hand as an intended touch input (e.g., the pointer finger and thumb of the opposite or weaker hand may be used to implement an intended zoom function on the touch surface). Consequently, the techniques described herein implement improved functionality for a device in that a user is able to provide simultaneous intended input to a touch surface using both (i) an input tool (e.g., an active pen) and (ii) one or more user fingers or a thumb. Moreover, any unintended touch input (e.g., contact from a palm) can be ignored or suppressed. This allows the device to operate more efficiently in that resources (e.g., processing resources) may be conserved as a result of not having to process unintended input or in that the device may perform multiple actions based on simultaneous inputs. Additionally, by correctly classifying a user touch input, the device and/or the touch surface may avoid executing a harmful operation based on accidental or inadvertent contact.

In various implementations, the classification may comprise more than one classification stage. Therefore, the techniques may use more than one classifier to determine that a user touch input is likely an unintended touch input or an intended touch input. In these implementations, a classification stage may evaluate various input factors, where each input factor may be associated with a weight representative of the input factor's importance and/or influence on an evaluation score for an individual classification stage. In at least one implementation further discussed herein, the techniques may use a first classifier to evaluate first input factors associated with the arrival of inputs (e.g., timing information associated with the arrival of a tool input and a touch input, position information associated with the arrival of a tool input and a touch input, a number of touch inputs that have arrived within a threshold period of time, etc.). If the techniques are unable to confidently classify the user touch input using the first classifier, the techniques may use a second classifier to evaluate second input factors. The second input factors may include one or more of the first input classifiers (e.g., with adjusted weights) and one or more additional input factors associated with movement of inputs (e.g., direction information of the movement of a tool input and a touch input, velocity information of the movement of a tool input and a touch input, etc.) and/or a duration of a touch input. If the techniques are still unable to confidently classify the user touch input using the second classifier, the techniques may use a third classifier where the weights used in the second classifier are further adjusted so that confident classification is more likely.

Using the multi-stage classification process (e.g., the first classifier and the subsequent classifiers discussed herein), the techniques can continually, e.g., over time, obtain and evaluate information associated with inputs as the information is detected. Thus, the techniques may provide an efficient and confident evaluation that adapts as additional information is gathered.

Conventional devices and/or touch surfaces automatically suppress user touch input while receiving input from an active input tool. Stated another way, no evaluation of the user touch input is performed to determine user intentions, and thus, the user is unable to use both the input tool and user touch input, e.g., via a finger, to provide simultaneous tool input and user touch input to a touch surface. Rather, if a user wants to perform a finger touch operation or a finger touch instruction while providing tool input via the input tool (e.g., writing a note or a message), the user must inconveniently set the input tool down or at least move the input tool an extended distance away from the touch surface, and then perform the finger touch operation or the finger touch instruction.

Accordingly, the techniques described herein are configured to provide the user with opportunity to provide simultaneous intended input by classifying user touch input (e.g., user touch input from a finger) as being either an unintended touch input or an intended touch input while an input tool is in use.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

FIG. 1 illustrates an example environment 100 in which techniques described herein may be implemented. The environment 100 includes one or more devices 102 (hereinafter "the device 102") configured to classify a user touch input as likely being either an unintended touch input or an intended touch input. For example, the device 102 may evaluate a variety of input factors associated with a tool input and/or a user touch input to determine whether individual touch inputs, or a group of touch inputs, are unintended or intended. If an individual touch input is classified as intended, then the device 102 may perform an action, such as a zooming function, a panning function, and so on. In contrast, if the individual touch input is classified as unintended (i.e., inadvertent, accidental, etc.), then the individual touch input may be ignored or suppressed and no further action may be performed by the device 102.

The device 102 may comprise a tablet computer, laptop computer, a desktop computer, a smart phone, an electronic reader device, an electronic book device, a mobile handset, a personal digital assistant (PDA), a portable navigation device, a portable gaming device, a game console, a watch, a portable media player, or any other electronic device that is configured to receive and process inputs (e.g., touch inputs, tool inputs, etc.). In some instances, the device 102 may comprise a mobile device, while in other instances the device 102 may comprise a stationary device.

The device 102 may be equipped with one or more processor(s) 104, memory 106, and one or more touch surfaces 108 (hereinafter "the touch surface 108"). Although not illustrated in FIG. 1, the device 102 may also include, or be associated, with network interface(s), display(s), speaker(s), additional input or sensor device(s) (e.g., a mouse, a keyboard, a joystick, a camera, a microphone, etc.), and/or other element(s).

The processor(s) 104 may be a single processing unit or a number of units, each of which could include multiple different processing units. The processor(s) 104 may include a microprocessor, a microcomputer, a microcontroller, a digital signal processor, a central processing unit (CPU), a graphics processing unit (GPU), etc. Alternatively, or in addition, the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that manipulate signals based on operational instructions. Among other capabilities, the processors 104 may be configured to fetch and execute computer-readable instructions stored in the memory 106.

The touch surface 108 may comprise any type of device/digitizer configured to detect touch input. The detection may be based on capacitive, optical or any other sensing techniques. The touch surface 108 may include a tactile sensor to sense touch, pressure and/or force (of an area of contact). Alternatively, or additionally, the touch surface 108 may include or be associated with a camera, microphone or another sensor (e.g., infrared sensor) to detect proximity or contact of an object. In one example, the touch surface 108 comprises a direct touch device/digitizer such as a touch screen (electronic display) configured to display content. In another example, the touch surface 108 comprises an indirect touch device/digitizer such as a touch pad (also known as a track pad). For a direct touch device (e.g., a touch screen), a display screen location is directly associated with touch input based on where a user touches the screen. In contrast, for an indirect touch device (e.g., a touch pad), touch input may have to mapped or converted to a corresponding location on a display screen. Although illustrated as being included in the device 102, the touch surface 108 may comprise an external device that is connected to or otherwise associated with the device 102, such as a touch screen monitor.

As discussed herein, an input may comprise, or be associated, with physical contact. For instance, an input tool or a finger may physically touch the touch surface 108 at a particular location. An input may alternatively comprise, or be associated, with non-physical contact. For instance, an input tool or a finger may be determined to be located within a pre-defined and/or detectable distance of the touch surface 108 but may not actually be in physical contact with the touch surface 108. An individual input corresponds to continuous (e.g., no break or gap in contact) contact provided by an individual input object. Thus, a touch input from a first finger is one contact while a touch input from a second finger is a second contact. Moreover, a larger contact from a palm of a hand may also be considered an individual touch input is there are no breaks or gaps.

The memory 106 may include software functionality configured as one or more "modules." As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface 108), firmware, and so on.

The memory 106 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

As illustrated in FIG. 1, the memory 106 includes a classification module 110. The classification module 110 is configured to classify a user touch input (e.g., a touch contact) as being either an unintended touch input or an intended touch input. The classification may occur while a user of the device is providing input via use of an input tool such as a pen or a stylus (e.g., an active pen). For instance, FIG. 1 illustrates that a first hand 112 of a user (e.g., the right hand which may be the strong hand) is handling or controlling an input tool 114 while the second hand 116 of the user (e.g., the left hand which may be the weaker hand) is also providing touch input. Of course, in some instances, the strong hand may be the left hand while the weaker hand may be the right hand, or a user may not have a strong hand or a weak hand (e.g., the user is ambidextrous).

In FIG. 1, the touch surface 108 and/or the device 102 are/is configured to determine whether or not the input tool 114 is providing a tool input, as shown by reference 118. For example, the input tool 114 may be actively providing tool input when the user is writing a message or scrolling through a group of photos. While the input tool 114 is in use and providing input, the touch surface 108 and/or the device 102 may also determine user touch input. In a first example, user touch input may be associated with input from a palm 120 of the hand 112 that is controlling the input tool 114. In a second example, user touch input may be associated with input from an upper portion 122 of the hand 112 that is controlling the input tool 114. These first two examples of input (e.g., 120 and 122) are most likely unintended contact that may frequently occur in association with user actions (e.g., the user may have a habit to rest a writing hand on a flat surface when writing a message). It is understood in the context of this document that there are other examples of common unintended input (e.g., a resting finger from hand 116). In a third example, user touch input may be associated with input from finger(s) 124 and/or a thumb 126 of the other hand 116. In some instances, these second two examples of input (e.g., 124 and 126) may be intended contact directed to instructing the device 102 to perform a particular action (e.g., a zooming function, a panning function, etc.). Although two inputs (e.g., 124 and 126) are associated with user intention and/or instruction to perform an action, it is understood that more or less than two contacts may be associated with user intention and/or instruction to perform an action.

Therefore, the touch surface 108 is configured to detect input and generate signals to be relayed to the device 102 and the classification module 110 is configured to classify, based on the relayed signals, a user touch input (e.g., one of 120, 122, 124 and 126) as being either an unintended touch input (e.g., 120 or 122) or an intended touch input (e.g., 124 and 126). In various implementations, the classification module 110 may use multiple classifiers to determine that a touch input is likely an unintended touch input or an intended touch input. For instance, a first classifier may evaluate various first input factors and calculate a first classifier evaluation score based on a first set of weights and a second classifier may evaluate various second input factors, e.g., including at least one input factor not evaluated in the first classifier, and calculate a second classifier evaluation score based on a second set of weights different than the first set of weights. The evaluation scores may be compared to evaluation confidence thresholds to ensure that the classification module 110 is confident in its classification of a touch input as either being an unintended touch input or an intended touch input.

In various implementations, sensors of the touch surface 108 are configured to report data about an input to the classification module 110. For instance, the sensors may include logic and other elements (e.g., a timing element) to determine and define position information and/or timing information (e.g., a position of a contact at a point in time). The data may be reported in real-time or the data may be reported in accordance with a periodic reporting schedule (e.g., ten millisecond intervals, twenty millisecond intervals, thirty millisecond intervals and so forth). The data reported to the classification module 110 may include the position information and/or the timing information from multiple objects in contact with the touch surface. As discussed, above, the touch surface 108 (e.g., or the device 102) may be configured to disambiguate between tool input and user touch input (e.g., a finger) by analyzing various contact characteristics such as the size of the area of contact (e.g., a finger contact area is typically larger than a pen contact area). Moreover, the touch surface 108 (e.g., or the device 102) may be configured to disambiguate between the tool input and the user touch input if the input tool is active such that it is capable of communicating signals (e.g., indicating user identification) to the touch surface 108.

Figure 2:
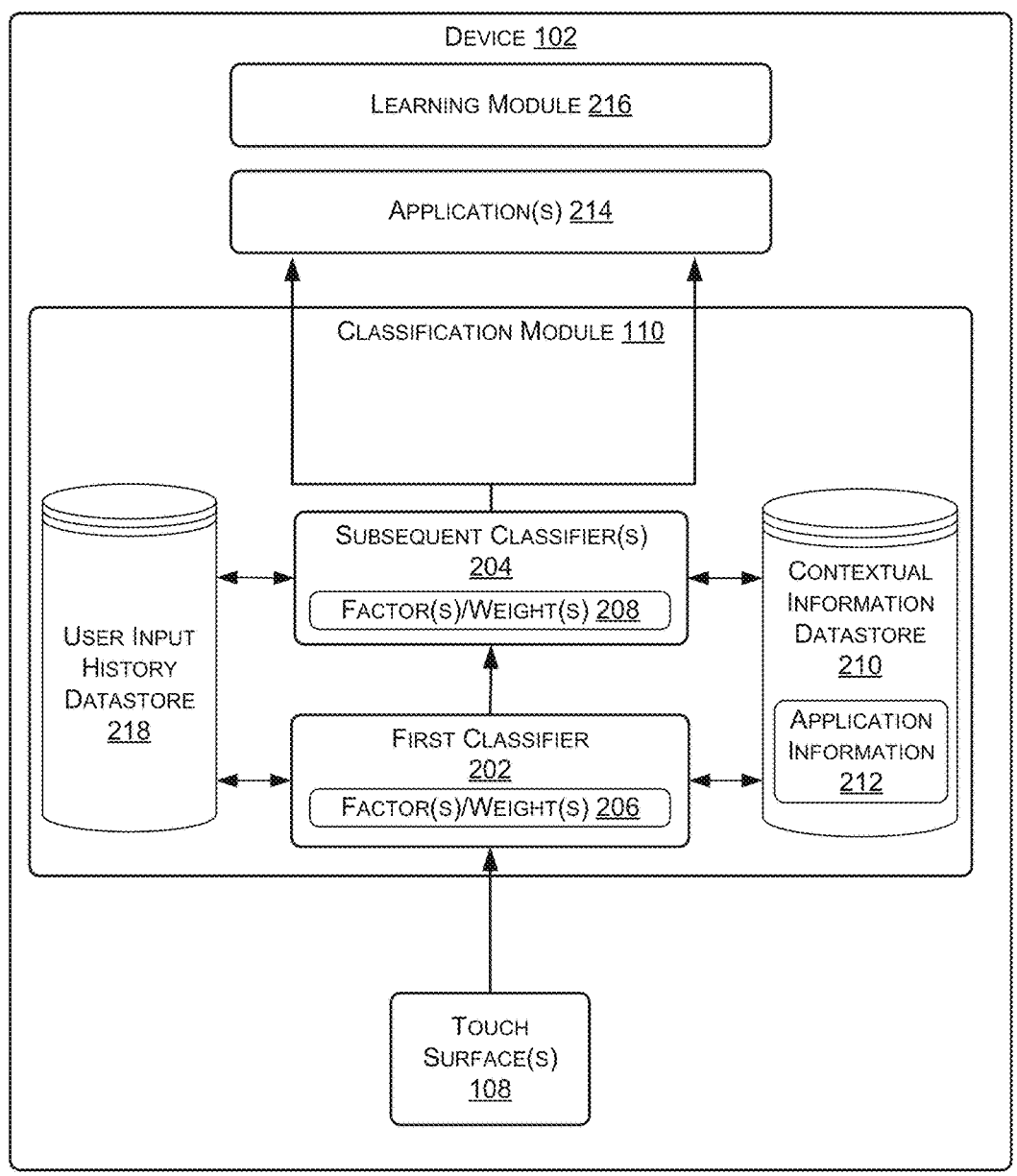
FIG. 2 illustrates example details of the device of FIG. 1.

FIG. 2 illustrates example details of the device 102 of FIG. 1. In particular, FIG. 2 illustrates details of one example implementation of the classification module 110 of the device 102. In this example implementation, the classification module 110 includes a first classifier 202 (e.g., a module) and one or more subsequent classifier(s) 204 (e.g., a second classifier and a third classifier).

Generally, the goal of the first classifier 202 may be to make a confident classification on whether a touch input is intended or unintended relatively quickly (e.g., without delay or with limited delay) based on available information. Meanwhile, the goal of the subsequent classifier(s) 204 may be to make a confident classification as more information in addition to that which was available to the first classifier 202 becomes available. As further discussed herein, the subsequent classifier(s) 204 may be used when the first classifier 202 is unable to confidently classify a touch input as being intended or unintended.

The first classifier 202 and/or the subsequent classifier(s) 204 may receive information associated with inputs (e.g., tool input and/or user touch input) from the touch surface 108. The first classifier 202 may be configured to evaluate one or more first classifier input factors, where each first classifier input factor has an associated weight, as referenced by 206. The first classifier input factors include information associated with an arrival of an input on the touch surface 108 (e.g., an initial contact with the touch surface 108). For example, the first classifier input factors may be based on one or more of: timing information associated with an arrival of an input, position information associated with an arrival of an input, and/or a number of inputs that arrived within a particular area of the touch surface. The input factors may be weighted so that particular input factors are given more importance than others when calculating an evaluation score. For example, a "first" first classifier input factor may have a weight of "0.5", a "second" first classifier input factor may have a weight of "0.3" and a "third" first classifier input may have a weight of "0.2" so the evaluation score will be calculated to be zero, one, or a decimal value somewhere between zero and one. Even though the preceding example uses three input factors, it is understood in the context of this document that in some classification stages less than three input factors can be used (e.g., one or two) or more than three input factors can be used (e.g., four, five, six, etc.). Using the weights, the first classifier 202 is configured to calculate the evaluation score based at least in part on evaluations of the first classifier input factors and to compare the first classifier evaluation score to a first classifier confidence threshold.

An evaluation of an individual input factor may indicate that a touch input is likely one of two alternatives, e.g., either intended (e.g., a positive outcome represented by the value "one") or unintended (e.g., a negative outcome represented by the value "zero"). Using the example weights from the previous paragraph, if the evaluations of the "first" first classifier input factor having a weight of "0.5" and the "third" first classifier input factor having a weight of "0.2" both indicate that a touch input is likely intended, and the evaluation of the "second" first classifier input factor having a weight of "0.3" indicates that a touch input is likely unintended, then first classifier 202 would calculate the evaluation score to be "0.7" by determining a summed amount (e.g., (0.5*1)+(0.2*1)+(0.3*0)). If the first classifier confidence threshold is "0.8" for intended touch input and if the first classifier confidence threshold is "0.2" for unintended touch input, then the first classifier 202 is unable to make a confident classification (e.g., the evaluation score "0.7" is not greater than or equal to "0.8" and the evaluation score "0.7" is not less than or equal to "0.2").

If, based on the comparison of the evaluation score and the first classifier confidence threshold(s), the first classifier 202 is unable to confidently classify the touch input, the classification module 110 may use a second classifier (e.g., one of subsequent classifiers 204) to provide further evaluation of input factors. Since the second classifier may be called upon after the first classifier, e.g., at a later time, additional information regarding the inputs has likely become available. This additional information is often associated with movement of an input and/or a duration of an input. Therefore, the second classifier may be configured to evaluate one or more second input factors, where each second input factor has an associated weight, as referenced by 208. The second input factors may include one or more of the first input factors evaluated by the first classifier. The second input factors may further include at least one new input factor not evaluated by the first classifier. For example, new input factor(s) may be based on one or more of: direction information associated with movement of an input, velocity information associated with movement of an input, or duration information of an input (e.g., a short-lived duration as further discussed herein). The second classifier may adjust the weights to improve classification and account for the one or more new input factors. For example, weights associated with input factors used by the first classifier may be decreased. Using the adjusted weights, the second classifier is configured to calculate a second classifier evaluation score based at least in part on evaluations of the second input factors and compare the second classifier evaluation score to a second classifier confidence threshold.

If, based on the comparison, the second classifier is unable to confidently classify the touch input, the classification module 110 may use a third classifier (e.g., one of subsequent classifiers 204) to further evaluate the touch input. In various implementations, the third classifier evaluates the same input factors evaluated by the second classifier, but further adjusts the weights so a confident classification outcome is more likely.

In various implementations, the first classifier 202 and subsequent classifier(s) 204 may analyze the information received from the touch surface 108 in light of contextual information stored in a contextual information datastore 210. For example, the contextual information may include application information 212 related to a program or an application 214 that is currently, or was recently, executing on the device 102. The application information 212 may indicate a type of application that is executing (e.g., a game application, a word processing application, an email application, or any other category of applications), content that is currently being displayed (e.g., video content is being displayed, user interface elements are being displayed, etc.), content of the application that is being interacted with (e.g., a type of field control to which input is being received), and so on. To illustrate, the application information 212 may indicate that users of the application may typically use particular user touch input (e.g., particular number of contacts, particular movement of contacts, etc.) to provide an intended instruction or command (e.g., a zoom function). In some implementations, the input factors selected to be evaluated by a particular classifier, the corresponding weights and/or the confidence thresholds may be variably determined based in part on contextual information stored in the contextual information database 210.

In various implementations, the memory 106 of the device 102 may also store a learning module 216. The learning module 216 may learn information related to a user's interaction with the device 102. For example, the learning module 216 may learn characteristics about the user's hands (e.g., a size of the tips of the user's fingers, a palm size, etc.), user interaction habits (e.g., contact between palm and touch surface while writing, a resting finger, etc.) and so on. This user information may be stored in a user input history datastore 218 and may be accessed and utilized to create a personalized user experience for the touch surface 108. For instance, a first user may have different learned characteristics from a second user, and the device can identify a user so that it can better classify touch input based on the learned characteristics. For instance, the device 102 may identify a user via authentication credentials (e.g., a login name and password) or via recognition or detection of an active input tool that identifies the user. In some implementations, the input factors selected to be evaluated by a particular classifier, the weights and/or the confidence thresholds may be variably determined based on the user information stored in the user input history datastore 218.

Figure 3:
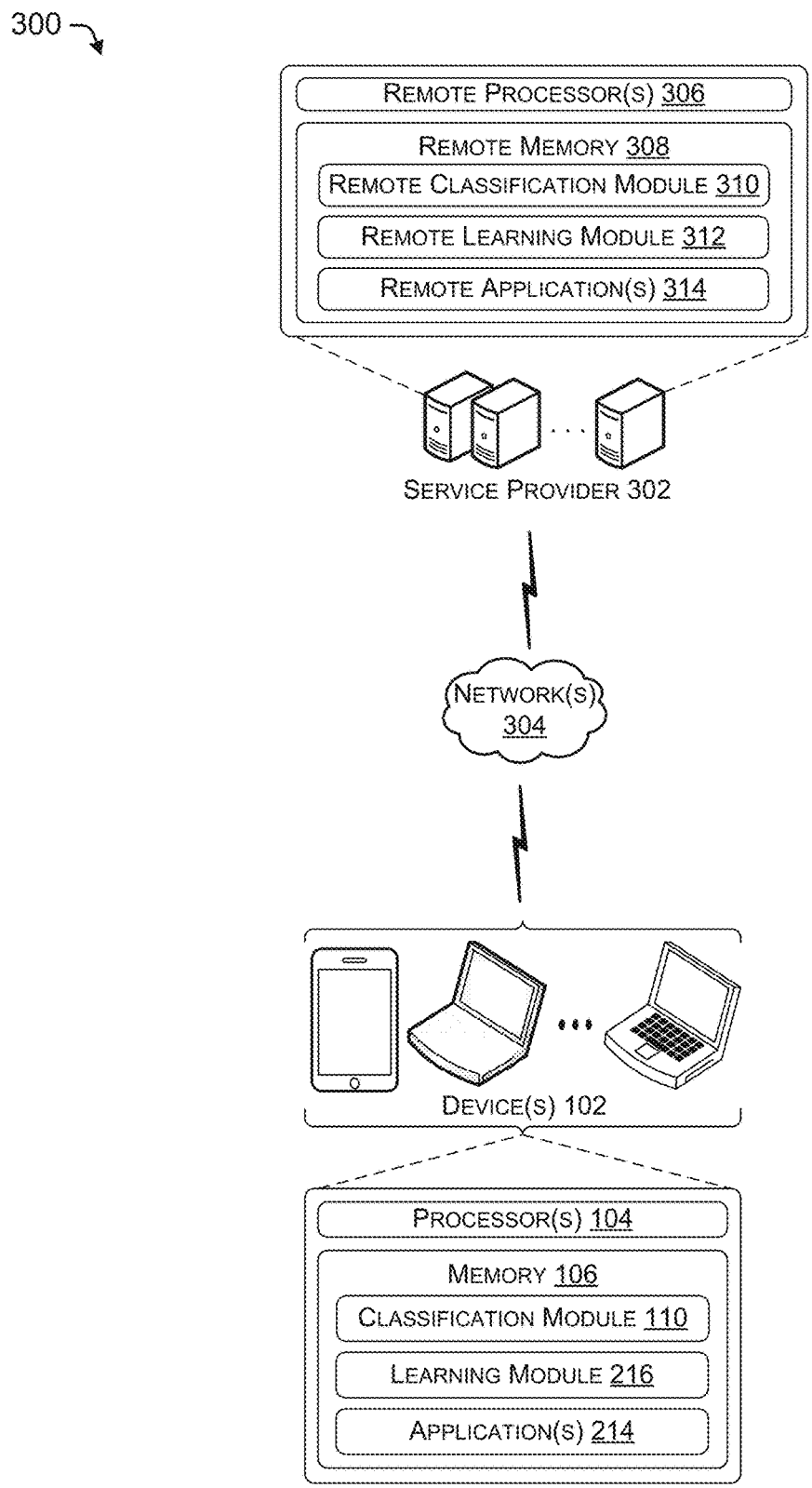
FIG. 3 illustrates an example network environment in which the device of FIG. 1 and/or a remote service provider can classify a touch input as being either an unintended touch input or an intended touch input.

FIG. 3 illustrates an example environment 300 where the device 102 is connected to a service provider 302 via one or more networks 304. The service provider 302 may provide one or more services to the device 102. The service provider 302 may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely to the device 102.

The service provider 302 may include modules, components, and/or elements similar to those included in the device 102, except that that they are executed and operated remotely (e.g., over network(s) 304). For example, the service provider 302 may be equipped with one or more remote processors 306 and remote memory 308 that may include a remote classification module 310, a remote learning module 312 and/or one or more remote application(s) 314. The remote classification module 310 and the remote learning module 312 of the service provider 302 may provide resources to the device 102 and may function similar to, or differently from, the classification module 110 and the learning module 216 on the device 102.

The one or more networks 304 may include any one or combination of multiple different types of networks, such as cellular networks, wireless networks, Local Area Networks (LANs), Wide Area Networks (WANs), Personal Area Networks (PANs), and the Internet.

Figure 4:
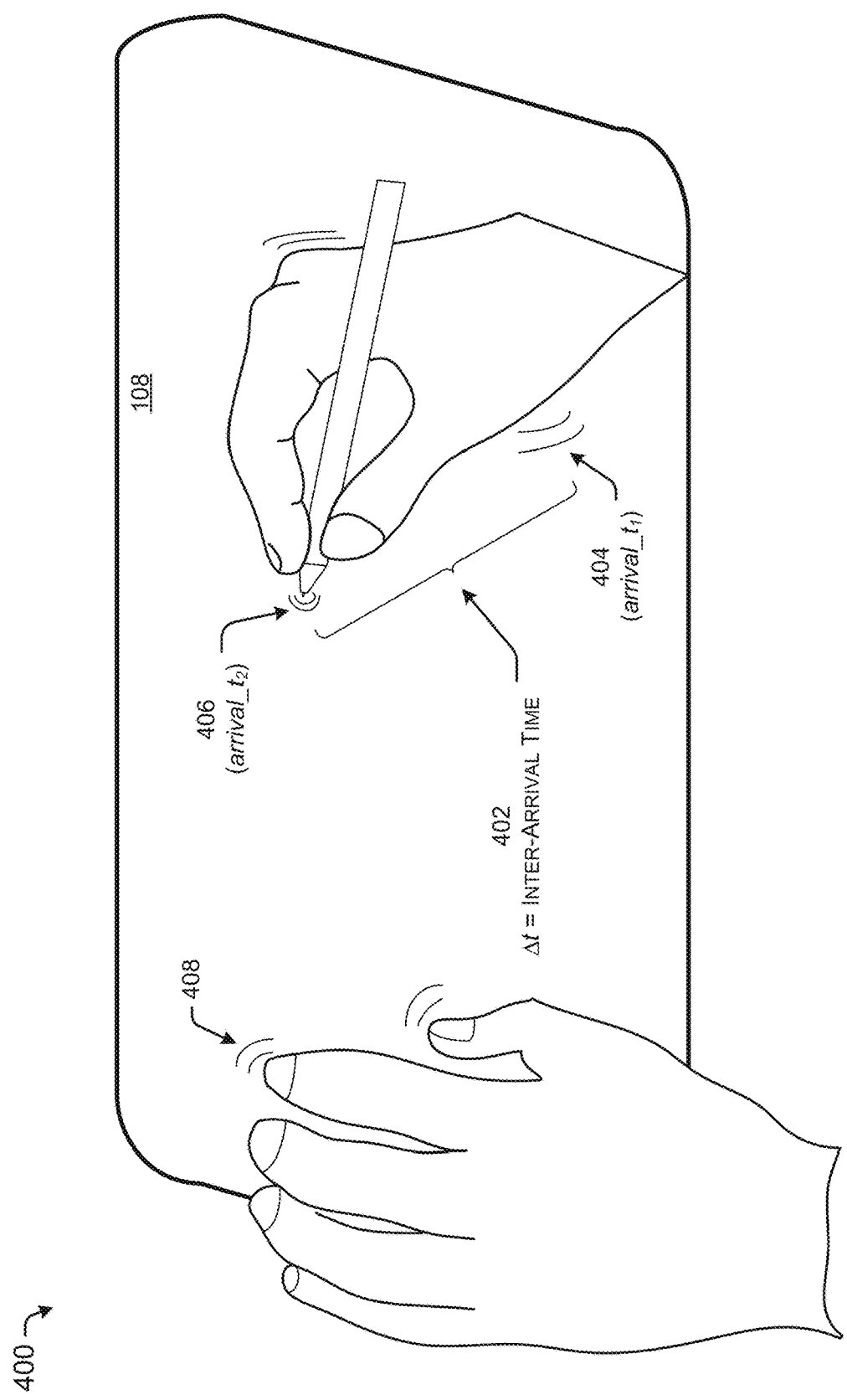
FIG. 4 illustrates an example diagram that shows an example input factor, associated with an inter-arrival time of inputs, that may be evaluated and weighted to classify a touch input as being either an unintended touch input or an intended touch input.

FIG. 4 illustrates an example diagram 400 that shows an example input factor that may be evaluated and weighted to contribute to a calculation of an evaluation score used to classify a user touch input as being either an unintended touch input or an intended touch input. The example input factor described with respect to FIG. 4 includes an inter-arrival time 402. The inter-arrival time 402 may be evaluated by one or more of the first classifier, the second classifier, and/or the third classifier.

The inter-arrival time 402 is the time difference (e.g., an absolute value) between (i) a time when a user touch input arrives or is initiated, e.g., a touch input from the palm 404 at time $t_1$, and (ii) a time when the tool input arrives or is initiated, e.g., an input from the input tool 406 at time $t_2$. To determine whether the inter-arrival time 402 indicates that the user touch input (e.g., 404) is likely unintended or intended, a classifier of the classification module 110 is configured to evaluate the inter-arrival time with respect to an inter-arrival time threshold. For example, an unintended touch input from a palm of the hand and an intended tool input from a point of the input tool typically make contact with, e.g., arrive at, the touch surface 108 within a threshold amount of time (e.g., one second, two seconds, etc.).

Accordingly, a classifier of the classification module 110 determines the inter-arrival time between a user touch input and the tool input and compares the inter-arrival time to the inter-arrival time threshold. If the inter-arrival time is less than the inter-arrival time threshold, then the evaluation of the inter-arrival time factor indicates that the user touch input is likely unintended and the outcome is "zero" (e.g., the user is resting his palm on the touch surface 108 while writing with a pen). In contrast, if the inter-arrival time is greater than or equal to the inter-arrival time threshold, then the evaluation of the inter-arrival time factor indicates that the user touch input is likely intended (e.g., the user is likely employing fingers on a non-writing hand to implement a zoom function as shown by reference 408) and the outcome is "one" which is multiplied by the corresponding weight to contribute to the evaluation score. The user touch input (e.g., 404) may occur before the tool input (e.g., 406), as shown in FIG. 4. Alternatively, the tool input may occur before the user touch input.

Figure 5:
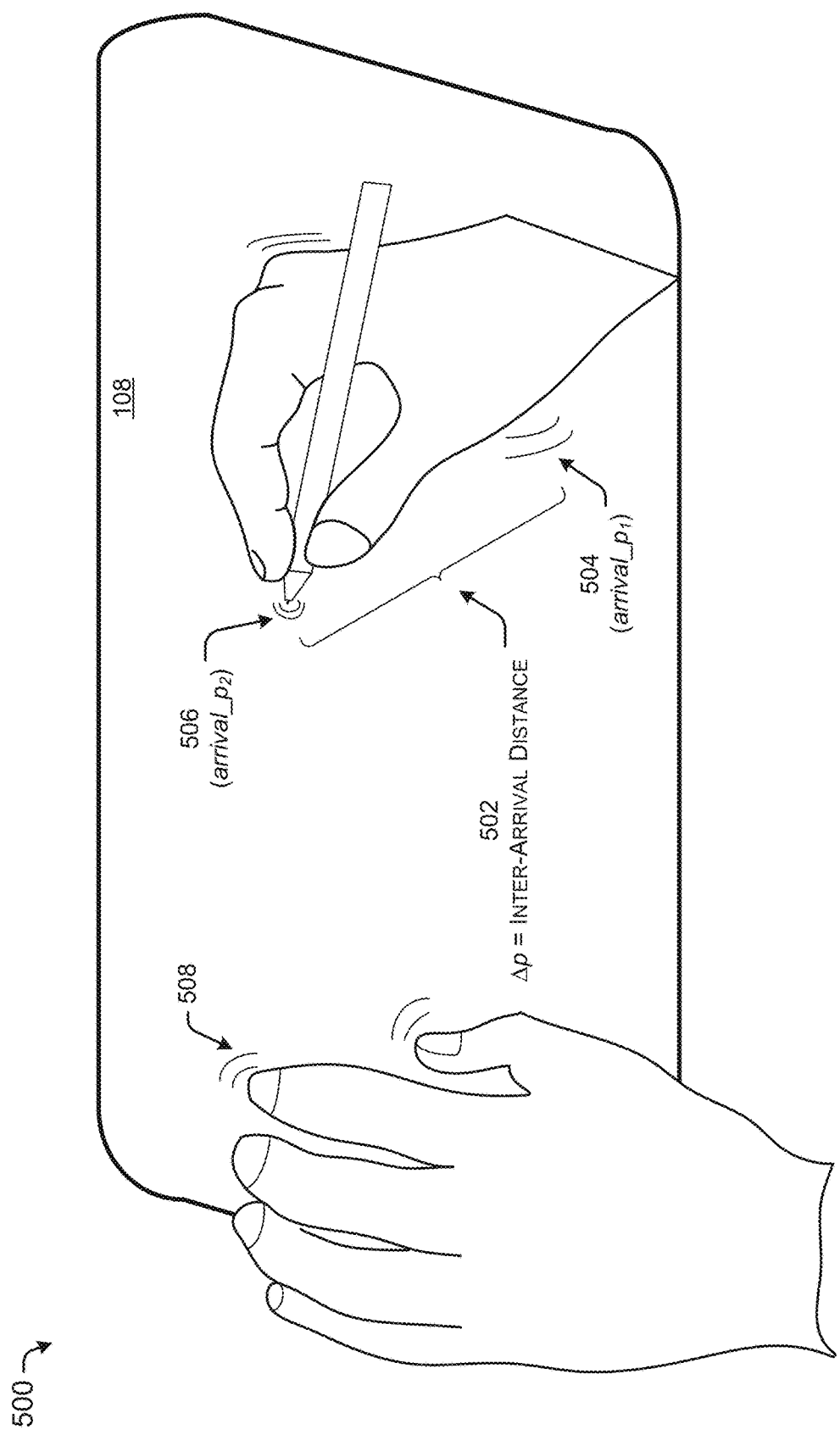
FIG. 5 illustrates an example diagram that shows another example input factor, associated with an inter-arrival distance of inputs, that may be evaluated and weighted to classify a touch input as being either an unintended touch input or an intended touch input.

FIG. 5 illustrates an example diagram 500 that shows another example input factor that may be evaluated and weighted to contribute to a calculation of an evaluation score used to classify a touch input as being either an unintended touch input or an intended touch input. The example input factor described with respect to FIG. 5 includes an inter-arrival distance 502. The inter-arrival distance 502 may be evaluated by one or more of the first classifier, the second classifier, and/or the third classifier.

The inter-arrival distance 502 is the positional difference (e.g., an absolute value) between (i) a position where a user touch input arrives or is initiated, e.g., a touch input from the palm 504 at position $p_1$ (e.g., this may be an average point of a larger contact space) and (ii) a position where the tool input arrives or is initiated, e.g., an input from the input tool 506 at position $p_2$. To determine whether the inter-arrival distance 502 indicates that the user touch input (e.g., 504) is likely intended or unintended, a classifier of the classification module 110 is configured to evaluate the inter-arrival distance with respect to an inter-arrival distance threshold. For example, an unintended touch input from a palm of the hand 504 and an input from a point of the input tool 506 typically make contact with, e.g., arrive at, the touch surface 108 within a inter-arrival distance threshold (e.g., ten centimeters, twelve centimeters, fifteen centimeters, etc.). As an example, the inter-arrival distance threshold may be set based on a size of the touch surface (e.g., dimensions such as height and width) and/or a size of the user's hand.

Accordingly, a classifier of the classification module 110 determines the inter-arrival distance between a user touch input and the tool input and compares the inter-arrival distance to the inter-arrival distance threshold. If the inter-arrival distance is less than the inter-arrival distance threshold, then the evaluation of the inter-arrival distance factor indicates that the user touch input is likely unintended and the outcome is "zero" (e.g., the user is resting his palm on the touch surface 108 while writing with a pen). In contrast, if the inter-arrival distance is greater than or equal to the inter-arrival distance threshold, then the evaluation of the inter-arrival distance factor indicates that the user touch input is likely intended (e.g., the user is likely employing fingers on a non-writing hand to implement a zoom function as shown by reference 508) and the outcome is "one" which is multiplied by the corresponding weight to contribute to the evaluation score.

Figure 6:
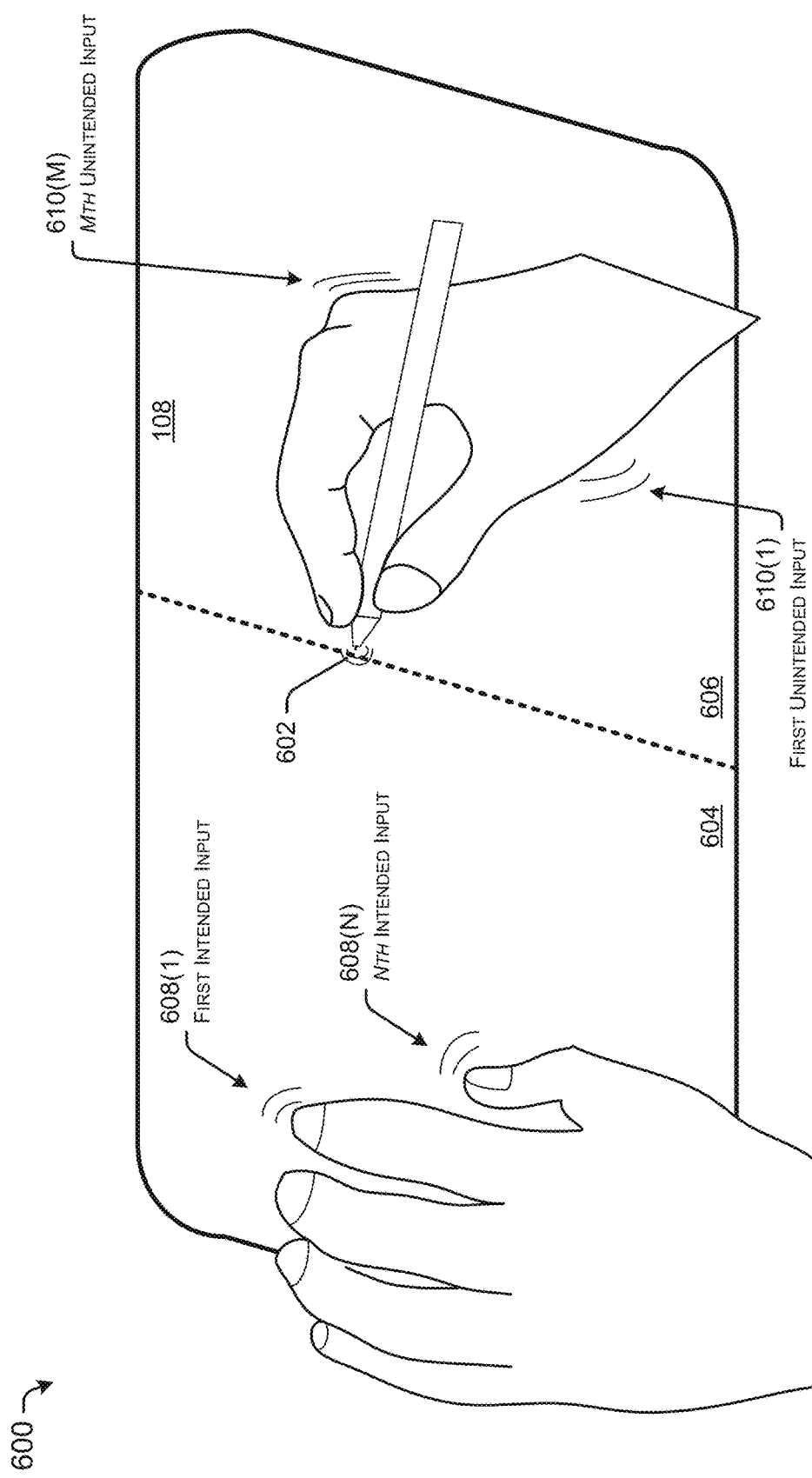
FIG. 6 illustrates an example diagram that shows another example input factor, associated with a number (e.g., a cluster) of inputs, that may be evaluated and weighted to classify a touch input as being an unintended touch input or an intended touch input.

FIG. 6 illustrates an example diagram 600 that shows another example input factor that may be evaluated and weighted to contribute to a calculation of an evaluation score used to classify a user touch input as being either an unintended touch input or an intended touch input. The example input factor described with respect to FIG. 6 includes a comparison of a number (e.g., a cluster) of inputs made in a particular section of the touch surface 108. The number of inputs may be evaluated by one or more of the first classifier, the second classifier, and/or the third classifier.

The number of inputs input factor is based on dividing the touch surface 108 into at least two sections. In various implementations, one of the classifiers of the classification module 110 determines a horizontal position 602 of the input tool and divides the touch surface into a first side (e.g., the left side 604 as shown in FIG. 6) based on the horizontal position 602 and a second side (e.g., the right side 606 as shown in FIG. 6) based on the horizontal position 602. The dotted line in FIG. 6 shows the division of the touch surface 108. The classifier may then determine a number of inputs within the respective sections (e.g., how many contacts are within a section or how many contacts are "clustered" in a section). For instance, FIG. 6 illustrates that the left side 604 includes N number of user inputs 608(1) . . . 608(N), where N is an integer number. FIG. 6 further illustrates that the right side 606 includes M number of user inputs 610(1) . . . 610(M), where M is also an integer number (e.g., N and M may be different or may be the same integer number). With respect to the example of FIG. 6, the inputs referred to by 608(1) . . . 608(N) are labeled as intended inputs (e.g., the user is intentionally inputting a zoom instruction) and the inputs referred to by 610(1) . . . 610(M) are labeled as unintended inputs (e.g., the user is resting the palm and/or an upper portion of a hand on the touch surface 108 and the input is not intended).

As discussed above, an input from an individual finger may be considered an individual input such that if the user uses two fingers there would be two inputs, if the user uses three fingers there would be three inputs, and so forth. Moreover, an input from a palm may be considered an individual input as well if it is continuous.

After determining the number of inputs, the classifier may compare a number of inputs in one section (e.g., N on the left side 604) to a number of inputs in another section (e.g., M on the right side 606) to determine a ratio (N:M), e.g., or vice versa (M:N). The classifier may then determine if the ratio is at least (2:1). In various implementations, if a user touch input (e.g., 608(1)) is evaluated to be part of a cluster, e.g., if N equals two or more in FIG. 6, that has at least twice as many inputs (e.g., a (2:1) ratio) compared to another cluster, e.g., if M equals one or less in FIG. 6, then the number of inputs input factor indicates that the user touch input (e.g., 608(1)) is likely intended, e.g., and the outcome is "one" which is multiplied by the corresponding weight to contribute to the evaluation score. In contrast, if a user touch input (e.g., 608(1)) is evaluated to be part of a cluster, e.g., if N=1 in FIG. 6, that does not have at least twice as many inputs compared to another cluster, e.g., if M=1 in FIG. 6, then the number of inputs input factor indicates that the user touch input (e.g., 608(1)) may be unintended, e.g., and the outcome of this evaluation is "zero".

Figure 7:
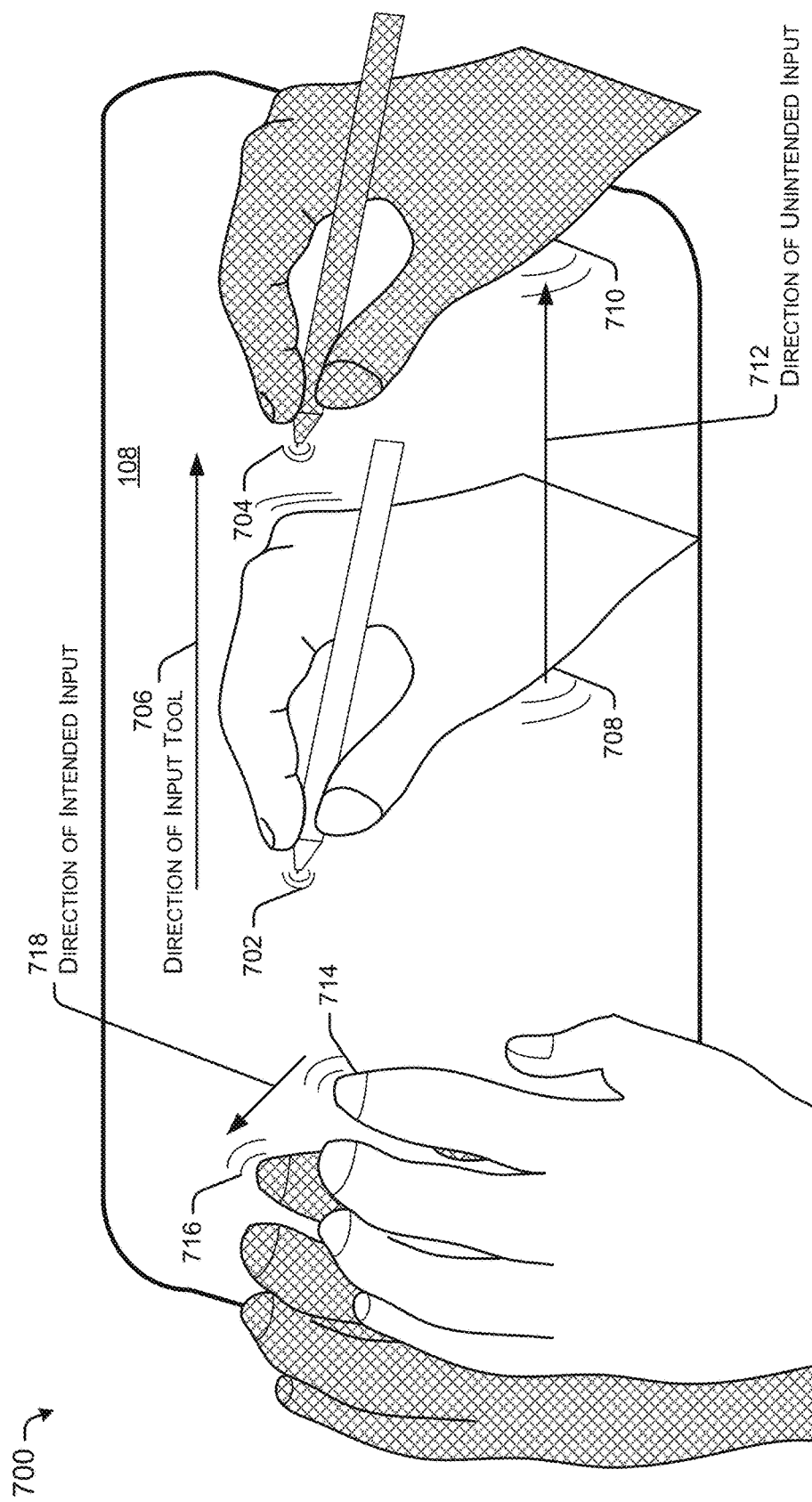
FIG. 7 illustrates an example diagram that shows another example input factor, associated with a direction of inputs, that may be evaluated and weighted to classify a touch input as being either an unintended touch input or an intended touch input.

FIG. 7 illustrates an example diagram 700 that shows another example input factor that may be evaluated and weighted to contribute to a calculation of an evaluation score used to classify a user touch input as being either an unintended touch input or an intended touch input. The example input factor described with respect to FIG. 7 includes a direction of movement of an input. Since information regarding movement of an input is sensed after the initial contact, in various implementations, the direction of movement input factor may be evaluated by one or more the second classifier and/or the third classifier.

The direction of movement of an input may be determined by tracking the sensed position of the input over time (e.g., from a first position to a second position). For instance, FIG. 7 illustrates that the input from the input tool, being controlled by the right hand of the user, has moved from position 702 to position 704. Thus, the direction of movement of the input tool is referenced by 706. Additionally, FIG. 7 illustrates that the touch input from the palm of the hand (e.g., an unintended input) has moved from position 708 to position 710. Thus, the direction of movement of the palm of the hand is referenced by 712. FIG. 7 further illustrates that the touch input from the finger of the other hand (e.g., an intended input) has moved from position 714 to position 716. Thus, the direction of movement of the finger is referenced by 718.

To evaluate the direction of movement input factor as indicating either unintended or intended user touch input, a classifier of the classification module 110 is configured to compare the direction of movement of a user touch input (e.g., 712 and/or 718) to the direction of movement of the tool input (e.g., 706) to determine a difference. Since an unintended input such as that provided by a palm may often move along, or close to, the same direction of the input tool (e.g., as shown by 706 and 712), the classifier may then further compare the difference in direction of movement (e.g., between a user touch input and a tool input) to a direction difference threshold (e.g., a particular angle separating two directions such as five degrees or ten degrees). If the further comparison determines that the difference in direction of movement is less than the direction difference threshold (e.g., the movement is in the same direction or close to the same direction), then the evaluation of the direction of movement input factor indicates that the user touch input is likely unintended and the outcome is "zero" (e.g., the user is resting his palm on the touch surface 108 and moving the palm as she/he writes with a pen). In contrast, if the difference in direction of movement is greater than or equal to the direction difference threshold, then the evaluation of the direction of movement input factor indicates that the user touch input is likely intended (e.g., the user is likely employing fingers on a non-writing hand to implement a zoom function where the direction of movement is considerably different than that of a pen) and the outcome is "one" which is multiplied by the corresponding weight to contribute to the evaluation score.

In various implementations where there are multiple user touch inputs, the classifier may compare the differences in direction of movements of the user touch inputs, with respect to the direction of movement of the tool input, and may determine which user touch input has a direction of movement that is closer to the direction of movement of the tool input (e.g., 706). The user touch input determined to be the closest may be determined to be an unintended touch input (e.g., the direction of 712 is closer to the direction of 706 when compared to the direction of 718). This may be done in addition, or as an alternative, to the evaluation based on the comparison to the direction difference threshold discussed above.

Figure 8:
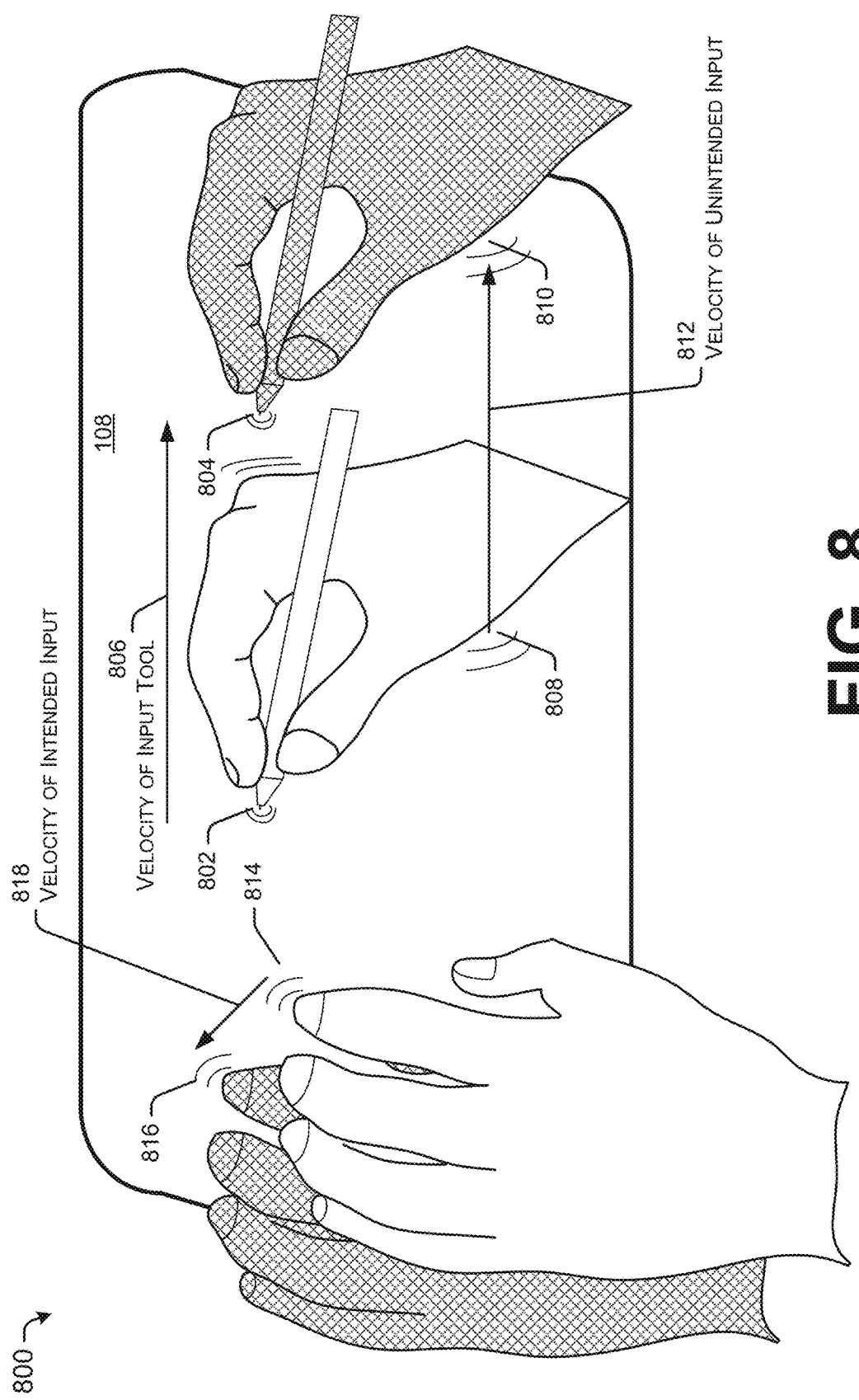
FIG. 8 illustrates an example diagram that shows another example input factor, associated with a velocity of inputs, that may be evaluated and weighted to classify a touch input as being either an unintended touch input or an intended touch input.

FIG. 8 illustrates an example diagram 800 that shows another example input factor that may be evaluated and weighted to contribute to a calculation of an evaluation score used to classify a user touch input as being either an unintended touch input or an intended touch input. The example input factor described with respect to FIG. 8 includes a velocity of movement of an input. Since information regarding movement of an input is sensed after the initial contact, in various implementations, the velocity of movement input factor may be evaluated by one or more the second classifier and/or the third classifier.

The velocity of movement may be determined using a change in position (e.g., a distance between a first position and a second position) of an input and a duration of the input (e.g., a difference between a first time and a second time). Thus, the velocity of movement may be calculated as ($\Delta p/\Delta t$), and may be represented by centimeters per millisecond (cm/ms). Therefore, the velocity of movement of an input may also be determined by tracking the sensed position of the input over time.

FIG. 8 illustrates that the input from the input tool, being controlled by the right hand of the user, has moved from position 802 to position 804 (e.g., 14 centimeters) and in a particular duration of time (e.g., 500 milliseconds). Thus, the velocity of movement of the input tool is referenced by 806. Additionally, FIG. 8 illustrates that the touch input from the palm of the hand (e.g., an unintended input) has moved from position 808 to position 810 in a particular duration of time. Thus, the velocity of movement of the palm of the hand is referenced by 812. FIG. 8 further illustrates that the touch input from the finger of the other hand (e.g., an intended input) has moved from position 814 to position 816 in a particular duration of time. Thus, the velocity of movement of the finger is referenced by 818.

To evaluate the velocity of movement input factor as indicating either unintended or intended user touch input, a classifier of the classification module 110 is configured to compare the velocity of movement of a user touch input (e.g., 812 and/or 818) to the velocity of movement of the tool input (e.g., 806) to determine a difference in velocity. Since an unintended input such as that provided by a palm may often move with the same, or close to the same, velocity of the input tool, the classifier may compare the difference in velocity of movement to a velocity difference threshold (e.g., a particular speed separating two velocities such as two centimeters per one hundred milliseconds). If the difference in velocity of movement is less than the velocity difference threshold (e.g., the inputs are moving at the same pace or close to the same pace), then the evaluation of the velocity of movement input factor indicates that the user touch input is likely unintended and the outcome is "zero" (e.g., the user is resting his palm on the touch surface 108 and moving the palm at the same pace of the pen as she/he writes with a pen). In contrast, if the difference in velocity of movement is greater than or equal to the velocity difference threshold, then the evaluation of the velocity of movement input factor indicates that the user touch input is likely intended (e.g., the user is likely employing fingers on a non-writing hand to implement a zoom function where the velocity of movement is considerably different than that of a pen) and the outcome is "one" which is multiplied by the corresponding weight to contribute to the evaluation score.

In various implementations where there are multiple user touch inputs, the classifier may compare the differences in velocity of movements of the user touch inputs, with respect to the velocity of movement of the tool input, and determine which user touch input has a velocity of movement that is closer to the velocity of movement of the tool input (e.g., 806). The user touch input determined to be the closest may be determined to be an unintended touch input (e.g., 812 is closer to 806 when compared to 818). This may be done in addition, or as an alternative, to the evaluation based on the comparison to the velocity difference threshold discussed above.

Figure 9:
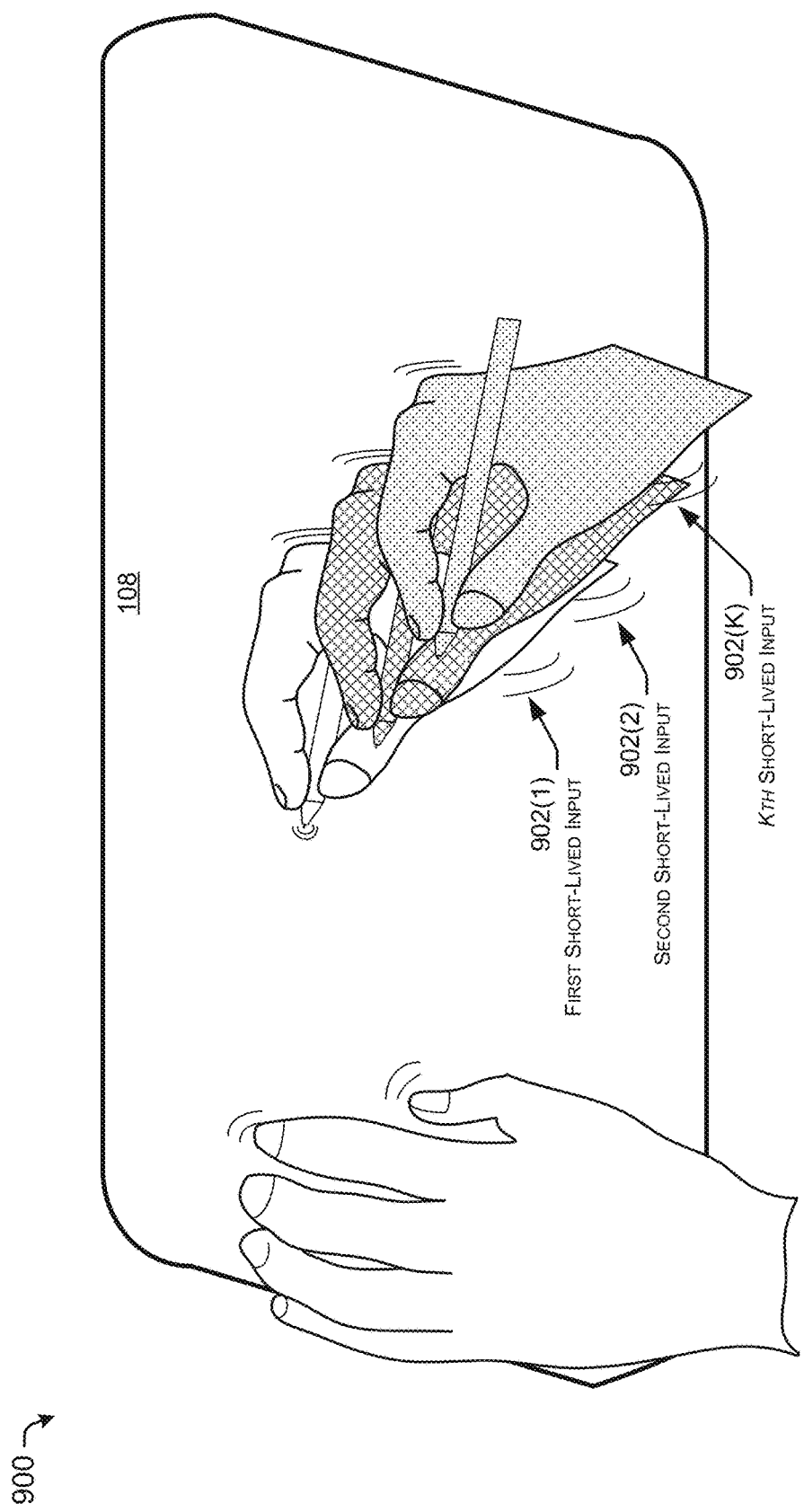
FIG. 9 illustrates an example diagram that shows another example input factor, associated with a short-lived duration of inputs, that may be evaluated and weighted to classify a touch input as being either an unintended touch input or an intended touch input.

FIG. 9 illustrates an example diagram 900 that shows another example input factor that may be evaluated and weighted to contribute to a calculation of an evaluation score used to classify a user touch input as being either an unintended touch input or an intended touch input. The example input factor described with respect to FIG. 9 includes a determination of whether or not a user touch input is part of a group of short-lived touch inputs. A short-lived touch input is one where the duration of the contact is less than a duration threshold (e.g., less than 200 ms, less than 500 ms, etc.). The determination of whether or not a user touch input is part of a group of short-lived touch inputs may be evaluated by the second classifier and/or the third classifier.

The classifier evaluates this input factor by first determining whether a user touch input is short-lived by comparing the duration of the touch input to the duration threshold. Then the classifier may determine a number of short-lived user touch inputs that occur over a period of time (e.g., two seconds, five seconds, ten seconds, etc.). For example, FIG. 9 illustrates that the palm of the hand that controls the input tool has caused K short-lived inputs 902(1) . . . 902(K), where K is an integer number. Thereafter, the classifier compares the number K to a short-lived input number threshold, and if the number K is greater than or equal to the short-lived input number threshold (e.g., three, five, seven, ten, etc.), then, for individual touch inputs (e.g., 902(1) . . . 902(K)) that are part of the group of short-lived touch inputs, the short-lived input factor indicates that the user touch input is likely unintended, e.g., and the outcome of this evaluation is "zero" (e.g., the palm is causing a series of short-lived contacts as the user is writing a message with a pen). In contrast, if the number K is less than the short-lived input number threshold, then, for individual touch inputs (e.g., 902(1) . . . 902(K)) that are part of the group of short-lived touch inputs, evaluation of the short-lived input factor indicates that the user touch input is likely an intended touch input, e.g., and the outcome is "one" which is multiplied by the corresponding weight to contribute to the evaluation score.

FIGS. 10-13 illustrate example processes for employing the techniques described herein. For ease of illustration, the example processes are described as being performed in the environment of FIG. 1, FIG. 2, FIG. 3, or any combination of FIGS. 1-3. For example, one or more of the individual operations of the example processes may be performed by the device 102 and/or the service provider 302. However, processes may be performed in other environment and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

Figure 10:
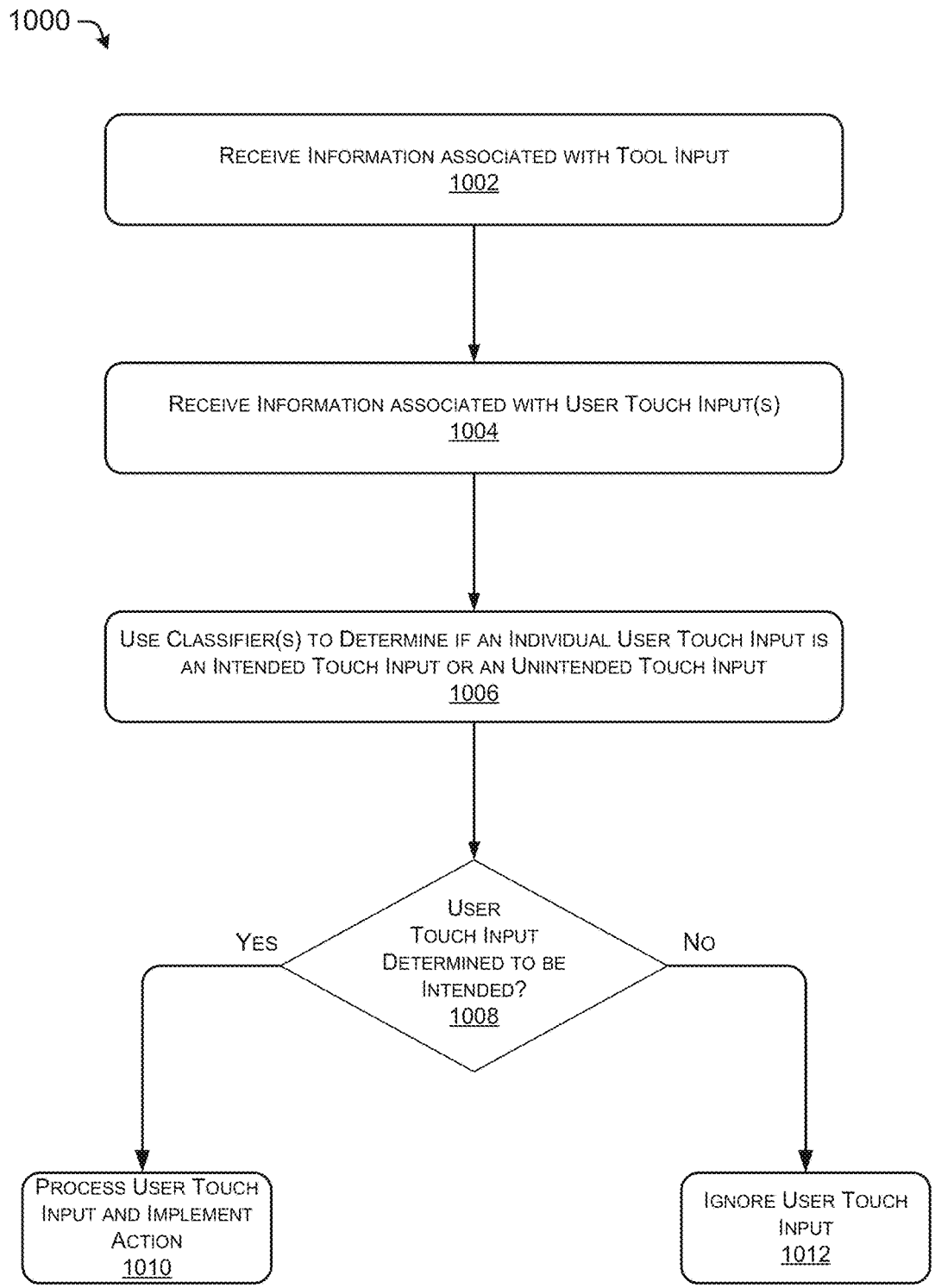
FIG. 10 illustrates an example process for classifying a touch input as either being an unintended touch input or an intended touch input.

FIG. 10 illustrates an example process 1000 that classifies a touch input as either being an unintended touch input or an intended touch input. In some examples, the classification occurs when an input tool is determined by the device 102 and/or the touch surface to be active.

At 1002, the classification module 110 receives information associated with a tool input, e.g., based on contact between an input tool and a touch surface (e.g., the remote classification module 310 may also be used with respect to the discussion of any one of FIGS. 10-13). The information may be associated with an arrival of the tool input and/or movement of the tool input. The classification module 110, other components of the device 102, or the touch surface 108 may be configured to disambiguate between input provided by the input tool and touch input provided by a user (e.g., via fingers, palms, thumbs, a portion of an arm, etc.) based on signal detection from the input tool and/or distinguishing characteristics between tool input and user input.

At 1004, the classification module 110 receives information associated with a user touch input(s), e.g., based on contact between user object(s) (e.g., fingers) and the touch surface. As discussed above, the information may be associated with an arrival of the user touch input and/or movement of the user touch input.

At 1006, the classification module 110 uses classifier(s) to determine if an individual user touch input is intended or unintended. For example, the classification module 110 may evaluate one or more of the input factors described above with respect to FIGS. 4-9 to determine whether a user touch input is intended or unintended.

At decision 1008, the classification determines whether the user touch input is intended. If the classification module 110 determines that the user touch input is intended ("Yes"), then the process proceeds to 1010 where the device 102 processes the user touch input and implements a responsive action (e.g., the device 102 implements a zoom function in response to receiving a zoom instruction).

At decision 1008, if the classification module 110 determines that the user touch input is unintended ("No"), then the process proceeds to 1012 where the device 102 ignores the user touch input.

Figure 11:
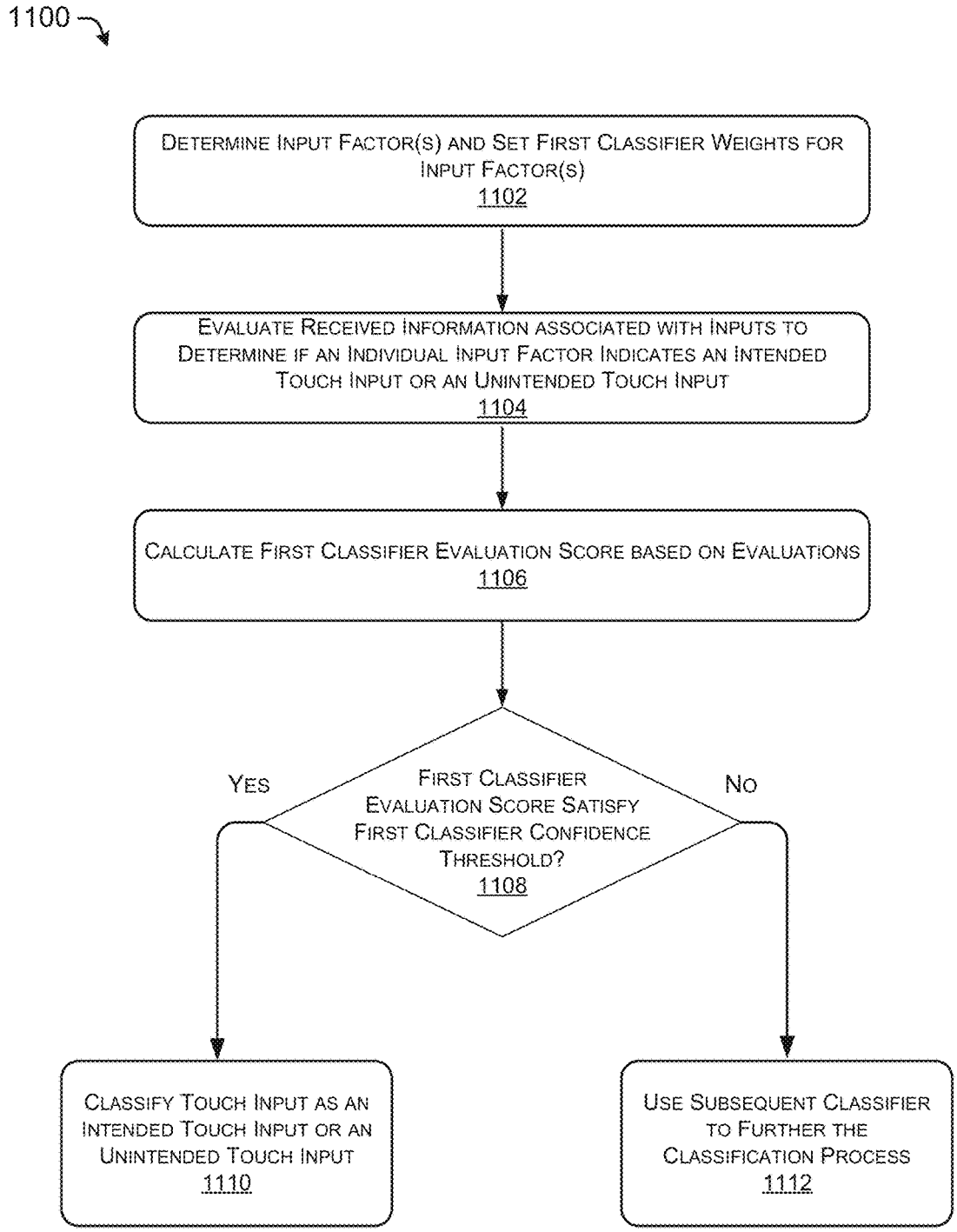
FIG. 11 illustrates an example process for implementing a first classification stage of a multi-stage classification.

FIG. 11 illustrates an example process 1100 that implements a first classification stage of a multi-stage classification. The example process 1100 may be implemented in association with operation 1006 from example process 1000 of FIG. 10.

At 1102, the first classifier 202 determines or access first input factors and sets weights for the first input factors. In various implementations, the first classifier input factors include information associated with an arrival of an input on the touch surface 108. In one example, the first classifier input factors may include the inter-arrival time factor discussed with respect to FIG. 4 and the inter-arrival distance factor discussed with respect to FIG. 5. In another example, the first classifier input factors may include the inter-arrival time factor, the inter-arrival distance factor, and the number (e.g., a cluster) of inputs discussed with respect to FIG. 6.

At 1104, the first classifier 202 evaluates the received information associated with the tool input and the user touch input to determine if an individual first classifier input factor indicates an intended touch input or an unintended touch input. For example, as part of the evaluation, the first classifier may determine an inter-arrival time and compare the determined inter-arrival time to an inter-arrival time threshold as discussed above with respect to FIG. 4. In another example, as part of the evaluation, the first classifier may determine an inter-arrival distance and compare the determined inter-arrival distance to an inter-arrival distance threshold as discussed above with respect to FIG. 5. In yet another example, as part of the evaluation, the first classifier may compare a number of inputs in a first section of a touch surface to a number of inputs in a second section of the touch interface to determine if a ratio is at least (2:1) as discussed above with respect to FIG. 6.

At 1106, the first classifier 202 calculates a first classifier evaluation score based on the evaluations. The first classifier uses the weights to calculate the first classifier evaluation score. For example, the inter-arrival time factor may be associated with a first weight (e.g., "0.6"), the inter-arrival distance factor may be associated with a second weight (e.g., "0.2"), and the number (e.g., a cluster) of contacts factor may be associated with a third weight (e.g., "0.2"), where the weights add up to the value one so that the first classifier evaluation score will be calculated to be zero, one, or a decimal value somewhere between zero and one.

At decision 1108, the first classifier 202 determines whether the first classifier evaluation score satisfies a first classifier confidence threshold. If the answer at 1108 is "Yes", then the process proceeds to 1110 where the first classifier confidently classifies the user touch input as either an intended touch input or an unintended touch input. If the answer at 1108 is "No", then the process proceeds to 1112 where the classification module 110 decides to use a subsequent classifier to further the classification process (e.g., the process moves to a subsequent stage, e.g., example process 1200 of FIG. 12, because the first classifier was unable to confidently classify the user touch input).

In various implementations, the first classifier may have a first classifier confidence threshold for an intended input (e.g., "0.79") and another first classifier confidence threshold for an unintended input (e.g., "0.41"). To illustrate a first example using the example weights from 1106, if the inter-arrival time factor and the number of inputs factor are evaluated to indicate a likelihood that the user touch input was intended, and if the inter-arrival distance factor is evaluated to indicate a likelihood that the user touch input was unintended, then the first classifier evaluation score would be "0.8" (e.g., $(0.6)*1+(0.2)*1+(0.2)*0$). Since the calculated evaluation score satisfies (e.g., is greater than or equal to) the first classifier confidence threshold for an intended input (e.g., "0.79"), then the first classifier can confidently classify the user touch input as an intended touch input.

To illustrate a second example using the example weights from 1106, if the inter-arrival time factor indicates a likelihood that the user touch input was unintended, and if the inter-arrival distance factor and the number of inputs factor are evaluated to indicate a likelihood that the user touch input was intended, then the first classifier evaluation score would be "0.4" (e.g., $(0.6)*0+(0.2)*1+(0.2)*1$). This calculated evaluation score also satisfies (e.g., is less than) the other first classifier confidence threshold for an unintended input (e.g., "0.41"), and thus, the first classifier can confidently classify the user touch input as an unintended touch input.

In contrast, if the first classifier evaluation score falls between "0.41" and "0.79" (e.g., the thresholds used in the preceding examples), then confident classification cannot be made by the first classifier.

As discussed above, the weights and/or the confidence thresholds may be variably set such that they can be trained and/or adjusted based on individual user input or a group of users' input (e.g., a larger sample of the population).

Figure 12:
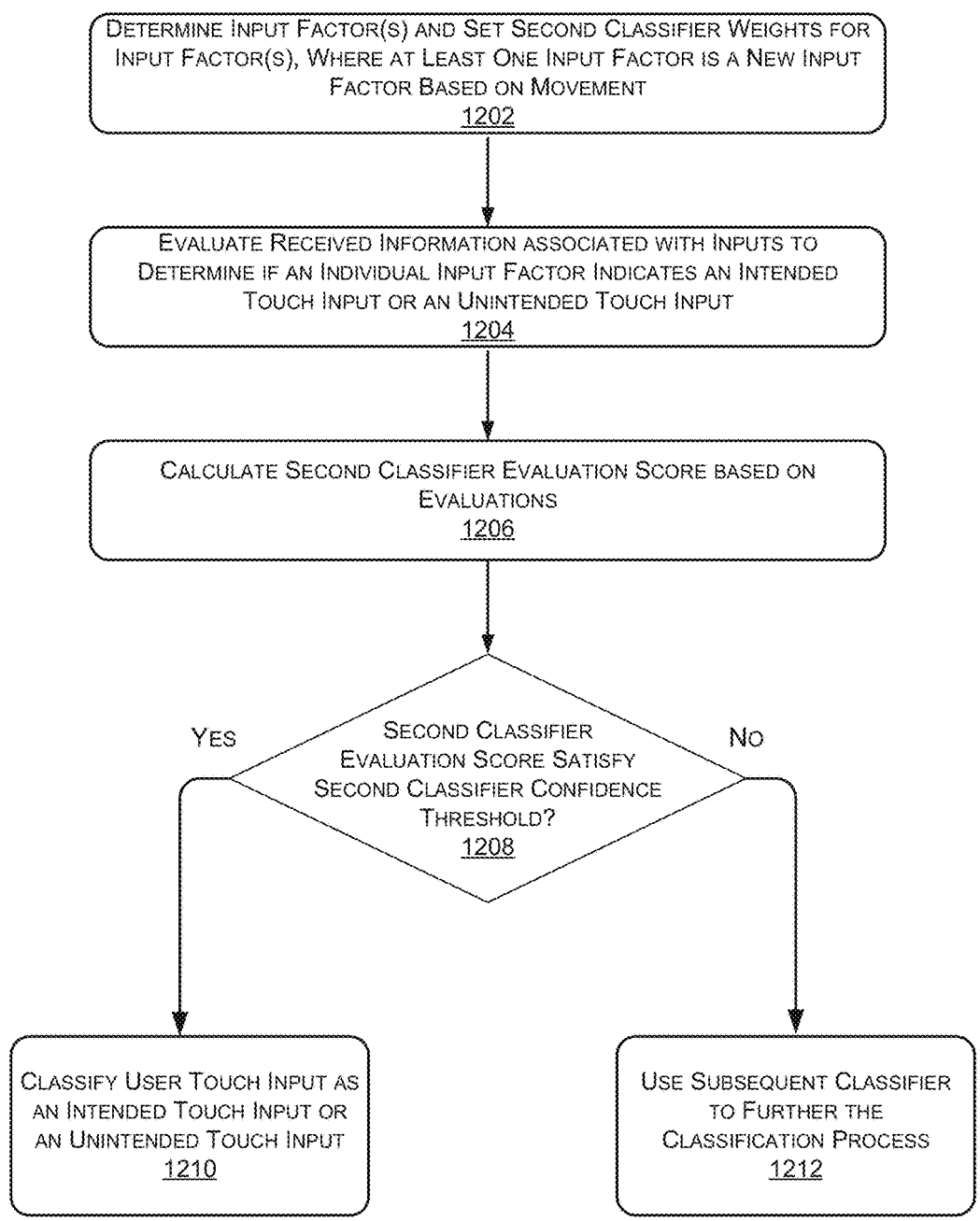
FIG. 12 illustrates an example process for implementing a second classification stage of a multi-stage classification if the first classification stage is unable to confidently classify a touch input.

FIG. 12 illustrates an example process 1200 that implements a second classification stage of a multi-stage classification if the first classification stage is unable to confidently classify a touch input. The example process 1200 may be implemented in association with operation 1112 from example process 1100 of FIG. 11.

At 1202, a second classifier (e.g., one of subsequent classifiers 204) determines or access second classifier input factors and sets weights for the second classifier input factors. In various implementations, the second classifier input factors may include one or more of the first classifier input factors. The second classifier input factors also include at least one new input factor based on movement of inputs. In one example, the second classifier input factors may include a direction factor discussed above with respect to FIG. 7. In another example, the second classifier input factors may include a velocity factor discussed above with respect to FIG. 8. In yet another example, the second classifier input factors may include the short-lived duration factor as discussed above with respect to FIG. 9. Thus, the second classifier input factors may include various combinations of input factors as discussed above with respect to FIGS. 4-9. In some example scenarios, if a first classifier input factor is also being evaluated as a second classifier input factor, then the corresponding weight is decreased to lessen its importance and influence on a contribution to the second classifier evaluation score. Conversely, a new input factor (e.g., direction difference factor or velocity difference factor) may have more importance and influence on the contribution to the second classifier evaluation score.

At 1204, the second classifier evaluates the received information (e.g., this may include previously received information and new information received after the start or the completion of the first classification in process 1100) associated with the tool input and the user touch input to determine if an individual second classifier input factor indicates an intended touch input or an unintended touch input. For example, as part of the evaluation, the second classifier may determine a difference in direction and compare the determined difference in direction to a direction difference threshold as discussed above with respect to FIG. 7. In another example, as part of the evaluation, the second classifier may determine a difference in velocity and compare the determined difference in velocity to a velocity difference threshold as discussed above with respect to FIG. 8. In yet another example, as part of the evaluation, the second classifier may compare a number of short-lived inputs to a short-lived input number threshold as discussed above with respect to FIG. 9.

In some instances, the second classifier may not need to re-evaluate an input factor that was evaluated by the first classifier, but the second classifier may adjust its corresponding weight to be used on an evaluation score calculation.

At 1206, the second classifier calculates a second classifier evaluation score based on the evaluations. The second classifier uses the weights to calculate the second classifier evaluation score. For example, a first weight associated with the inter-arrival time factor may be "0.3", a decreased value compared to that used as an example in process 1100. Continuing this example, a second weight associated with the inter-arrival distance factor may be "0.1", also a decreased value compared to that used as an example in process 1100. Continuing this example, a weight associated with the number of inputs factor may no longer exist because the number of inputs factor may not be used by the second classifier. Moving on, a third weight associated with the direction factor may be "0.4" and a fourth weight associated with the velocity factor may be "0.2" (e.g., the four weights again add up to one). The second classifier evaluation score may be calculated similar to the examples provided above, e.g., multiply the outcome of an evaluation (e.g., zero indicating unintended or one indicating intended) times a corresponding second classifier weight, and sum the contributions from each of the second classifier input factors.

At decision 1208, the second classifier determines whether the second classifier evaluation score satisfies a second classifier confidence threshold. If the answer at 1208 is "Yes", then the process proceeds to 1210 where the second classifier confidently classifies the user touch input as either an intended touch input or an unintended touch input. If the answer at 1208 is "No", then the process proceeds to 1212 where the classification module 110 decides to use a subsequent classifier to further classification process (e.g., the process moves to a subsequent stage, e.g., example process 1300 of FIG. 13, because the first classifier and the second classifier were both unable to confidently classify the user touch input).

The second classifier may also have a second classifier confidence threshold for an intended input and another second classifier confidence threshold for an unintended input. The second classifier confidence thresholds may be the same or different than the first classifier confidence thresholds.

Figure 13:
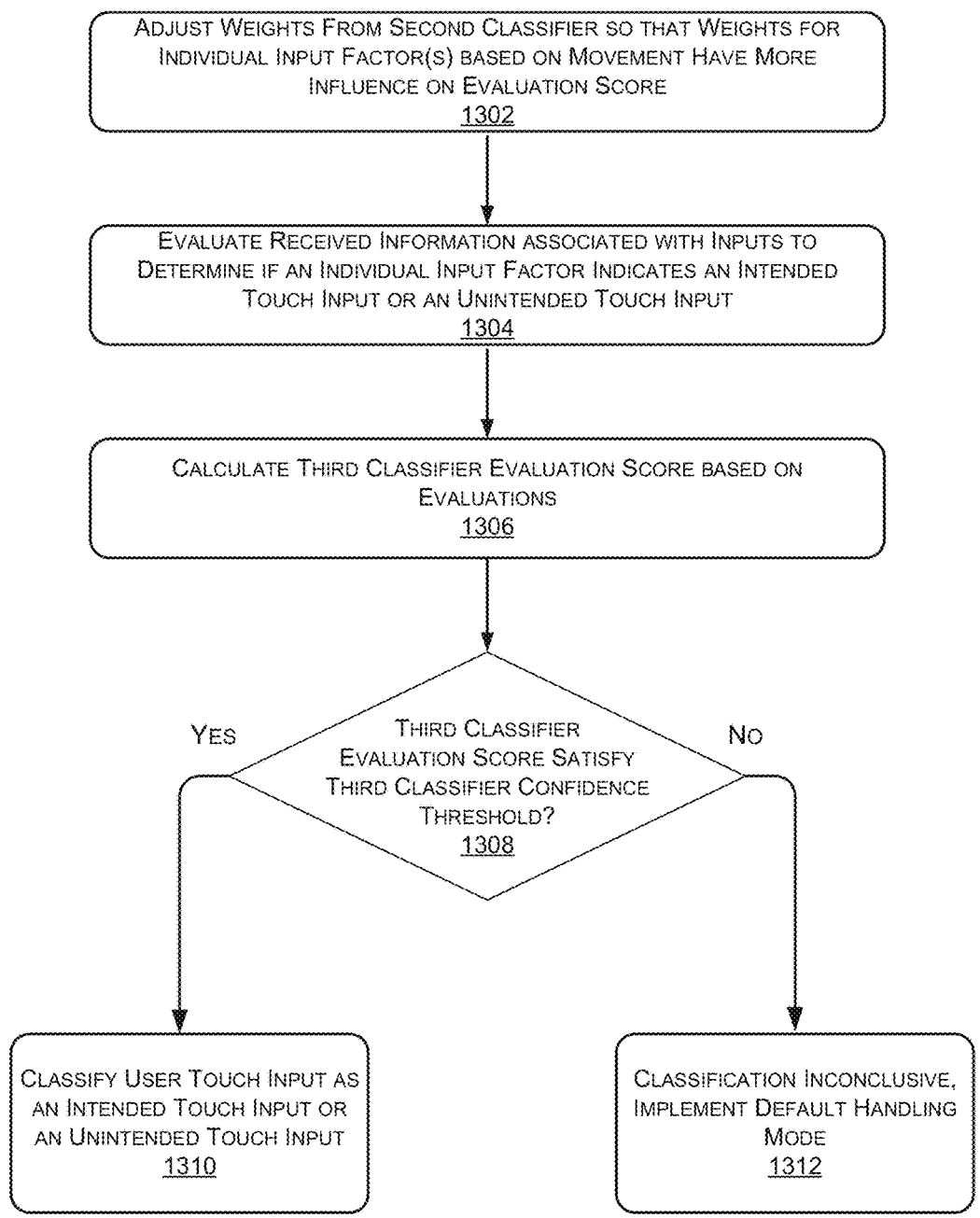
FIG. 13 illustrates an example process for implementing a third classification stage of a multi-stage classification if the first classification stage and the second classification stage are unable to confidently classify a touch input.

FIG. 13 illustrates an example process 1300 that implements a third classification stage of a multi-stage classification if the first classification stage and the second classification stage are unable to confidently classify a touch input. The example process 1300 may be implemented in association with operation 1212 from example process 1200 of FIG. 12.

At 1302, a third classifier (e.g., one of subsequent classifiers 204) adjusts the weights used by the second classifier for the second classifier input factors. In various implementations, the third classifier does not introduce any new input factors compared to those used by the second classifier. Rather, the third classifier increases the weights for the input factors associated with movement (e.g., a direction factor and/or a velocity factor) and decreases the weights for the input factors associated with arrival (e.g., inter-arrival time factor and inter-arrival distance factor).

At 1304, the third classifier evaluates the received information (e.g., this may include previously received information and new information received after the start or the completion of the second classification in process 1200) associated with the tool input and the user input to determine if an individual third classifier input factor indicates an intended touch input or an unintended touch input. In some instances, the third classifier may not need to re-evaluate an input factor that was evaluated by the first classifier or the second classifier.

At 1306, the third classifier calculates a third classifier evaluation score based on the evaluations. The third classifier uses the adjusted weights to calculate the third classifier evaluation score.

At decision 1308, the third classifier determines whether the third classifier evaluation score satisfies a third classifier confidence threshold. If the answer at 1308 is "Yes", then the process proceeds to 1310 where the third classifier confidently classifies the user touch input as either an intended touch input or an unintended touch input. If the answer at 1308 is "No", then the process proceeds to 1312 where the classification module 110 determines that the classification is inconclusive and implements a default handling mode with respect to the user touch input (e.g., automatically suppress the user touch input, provide a notification to the user indicating an unclassified touch input, etc.).

The third classifier may also have a third classifier confidence threshold for an intended input and another third classifier confidence threshold for an unintended input. The third classifier confidence thresholds may be the same or different than the first or second classifier confidence thresholds.

CONCLUSION

Although examples and/or implementations have been described in language specific to structural features and/or methodological acts, it is to be understood that the disclosure is not necessarily limited to the specific features or acts described. Rather, the specific features and acts are disclosed herein as illustrative forms of implementing the examples and/or implementations.

EXAMPLE CLAUSES

Example A, a system (e.g., a device 102) comprising: a touch surface configured to receive a plurality of inputs including at least a tool input associated with an input tool and a user touch input; one or more processors communicatively coupled to the touch surface; memory communicatively coupled to the one or more processors; a classification module stored in the memory and executable by the one or more processors to: implement a first classifier to evaluate information associated with the tool input and the user touch input to determine whether the user touch input is an intended touch input or an unintended touch input, wherein the information evaluated is associated with an arrival of the tool input relative to an arrival of the user touch input; and in response to the first classifier being unable to determine whether the user touch input is the intended touch input or the unintended touch input, implement at least one subsequent classifier to evaluate additional information to determine whether the user touch input is the intended touch input or the unintended touch input, wherein the additional information evaluated is associated with a movement of the tool input relative to a movement of the user touch input.

Example B, the system of Example A, wherein: the input tool comprises one of an active pen or an active stylus configured to generate a signal that is detectable by the touch surface and that is usable by the touch surface to distinguish between the tool input and the user touch input; and the user touch input is based on contact from a finger or a palm of a hand of a user.

Example C, the system of Example A or Example B, wherein the first classifier evaluates the information to determine an inter-arrival time between a time when the tool input arrives at the touch surface and a time when the user touch input arrives at the touch surface.

Example D, the system of Example C, wherein: if the inter-arrival time is less than an inter-arrival time threshold, then at least part of the evaluation of the first classifier indicates that the user touch input is the unintended touch input; and if the inter-arrival time is greater than or equal to the inter-arrival time threshold, then at least part of the evaluation of the first classifier indicates that the user touch input is the intended touch input.

Example E, the system of any one of Example A through Example D, wherein the first classifier evaluates the information to determine an inter-arrival distance between a position where the tool input arrives at the touch surface and a position where the user touch input arrives at the touch surface.

Example F, the system of Example E, wherein: if the inter-arrival distance is less than an inter-arrival distance threshold, then at least part of the evaluation of the first classifier indicates that the user touch input is the unintended touch input; and if the inter-arrival distance is greater than or equal to the inter-arrival distance threshold, then at least part of the evaluation of the first classifier indicates that the user touch input is the intended touch input.

Example G, the system of any one of Example A through Example F, wherein the at least one subsequent classifier evaluates the additional information to determine a difference between a direction of movement of the tool input and a direction of movement of the user touch input.

Example H, the system of Example G, wherein: if the difference is less than a direction difference threshold, then at least part of the evaluation of the at least one subsequent classifier indicates that the user touch input is the unintended touch input; and if the difference is greater than or equal to the direction difference threshold, then at least part of the evaluation of the at least one subsequent classifier indicates that the user touch input is the intended touch input.

Example I, the system of any one of Example A through Example H, wherein the at least one subsequent classifier evaluates the additional information to determine a difference between a velocity of movement of the tool input and a velocity of movement of the user touch input.

Example J, the system of Example I, wherein: if the difference is less than a velocity difference threshold, then at least part of the evaluation of the at least one subsequent classifier indicates that the user touch input is the unintended touch input; and if the difference is greater than or equal to the velocity difference threshold, then at least part of the evaluation of the at least one subsequent classifier indicates that the user touch input is the intended touch input.

While Example A through Example J are described above with respect to a system, it is understood in the context of this document that the content of Example A through Example J may also be implemented as a method and/or via one or more computer storage media storing computer-readable instructions.

Example K, a method comprising: determining that a first input of a plurality inputs simultaneously received at a touch surface is associated with an active input tool; determining that at least a second input of the plurality of inputs is associated with user touch; and evaluating, by one or more processors, at least one factor associated with the first input and the second input to classify the second input as an intended touch input or an unintended touch input.

Example L, the method of Example K, wherein the at least one factor comprises at least one first factor that is associated with an arrival of the first input relative to an arrival of the second input, and the method further comprises: calculating an evaluation score based at least in part on the evaluation of the at least one first factor; comparing the evaluation score to at least one confidence threshold; if, based on the comparing, the evaluation score satisfies the at least one confidence threshold, classifying the second input as the intended touch input or the unintended touch input; and if, based on the comparing, the evaluation score fails to satisfy the at least one confidence threshold, evaluating at least one second factor associated with the first input and the second input, the at least one second factor being associated with a movement of the first input relative to a movement of the second input.

Example M, the method of Example K or Example L, wherein the at least one factor is associated with a determination of an inter-arrival distance between a position where the first input arrives at the touch surface and a position where the second input arrives at the touch surface.

Example N, the method of any one of Example K through Example M, wherein the at least one factor is associated with a determination of an inter-arrival interval between a time when the first input arrives at the touch surface and a time when the second input arrives at the touch surface.

Example O, the method of any one of Example K through Example N, wherein the at least one factor is associated with a determination of a difference between a direction of movement of the first input and a direction of movement of the second input.

Example P, the method of any one of Example K through Example O, wherein the at least one factor is associated with a determination of a difference between a velocity of movement of the first input and a velocity of movement of the second input.

Example Q, the method of any one of Example K through Example P wherein the at least one factor is associated with a first determination of a first number of inputs in a first section of the touch surface relative to a second determination of a second number of inputs in a second section of the touch surface.

Example R, the method of any one of Example K through Example Q, wherein the at least one factor is associated with a determination of a number of short-lived inputs.

Example S, the method of any one of Example K through Example R, wherein: the input tool comprises one of an active pen or an active stylus configured to generate a signal that is detectable by the touch surface and that is usable by the touch surface to distinguish between the first input and the second input; and the second input is based on contact from a finger or a palm of a hand of a user.

While Example K through Example S are described above with respect to a method, it is understood in the context of this document that the content of Example K through Example S may also be implemented as a system (e.g., a device) and/or via one or more computer storage media storing computer-readable instructions.

Example T, one or more computer storage media storing computer-readable instructions that, when executed by one or more processors, configure a device to perform operations comprising: implementing a first classifier to evaluate a plurality of first classifier factors associated with a tool input and a touch input, the plurality of first classifier factors to classify the touch input as being either an intended touch input or an unintended touch input, wherein each first classifier factor of the plurality of first classifier factor has a corresponding weight to calculate an evaluation score; determining, based at least in part on the evaluation score, that the first classifier is unable to confidently classify the touch input as being either the intended touch input or the unintended touch input; and implementing a subsequent classifier to evaluate a plurality of second classifier factors associated with the tool input and the touch input, wherein the plurality of second classifier factors includes at least one first classifier factor with a corresponding weight adjusted to decrease an evaluation score influence of the at least one first classifier factor during the implementation of the subsequent classifier.

Example U, the one or more computer storage media of Example T, wherein: one or more first classifier factors of the plurality of first classifier factors are based at least in part on an arrival of the tool input relative to an arrival of the touch input; one or more second classifier factors of the plurality of second classifier factors are based at least in part on movement of the tool input relative to movement of the touch input; and the corresponding weights are set based at least in part on learned user input information.

Example V, the one or more computer storage media of Example T or Example U, wherein: the input tool comprises one of an active pen or an active stylus configured to generate a signal that is detectable by a touch surface and that is usable by the touch surface to distinguish between the tool input and the touch input; and the touch input is based on contact from a finger or a palm of a hand of a user.

While Example T through Example V are described above with respect to one or more computer storage media, it is understood in the context of this document that the content of Example T through Example V may also be implemented as a system (e.g., a device) and/or a method.

Example W, a system (e.g., a device 102) comprising: means for receiving a plurality of inputs including at least a tool input associated with an input tool and a user touch input; means for evaluating information associated with the tool input and the user touch input to determine whether the user touch input is an intended touch input or an unintended touch input, wherein the information evaluated is associated with an arrival of the tool input relative to an arrival of the user touch input; and in response to the means being unable to determine whether the user touch input is the intended touch input or the unintended touch input based on the information evaluated, means for evaluating additional information to determine whether the user touch input is the intended touch input or the unintended touch input, wherein the additional information evaluated is associated with a movement of the tool input relative to a movement of the user touch input.

Example X, the system of Example W, wherein: the input tool comprises one of an active pen or an active stylus configured to generate a signal that is detectable by the touch surface and that is usable by the touch surface to distinguish between the tool input and the user touch input; and the user touch input is based on contact from a finger or a palm of a hand of a user.

Example Y, the system of Example W or Example X, wherein the means evaluates the information to determine an inter-arrival time between a time when the tool input arrives at the touch surface and a time when the user touch input arrives at the touch surface.

Example Z, the system of Example Y, wherein: if the inter-arrival time is less than an inter-arrival time threshold, then at least part of the evaluation indicates that the user touch input is the unintended touch input; and if the inter-arrival time is greater than or equal to the inter-arrival time threshold, then at least part of the evaluation indicates that the user touch input is the intended touch input.

Example AA, the system of any one of Example W through Example Z, wherein the means evaluates the information to determine an inter-arrival distance between a position where the tool input arrives at the touch surface and a position where the user touch input arrives at the touch surface.

Example BB, the system of Example AA, wherein: if the inter-arrival distance is less than an inter-arrival distance threshold, then at least part of the evaluation indicates that the user touch input is the unintended touch input; and if the inter-arrival distance is greater than or equal to the inter-arrival distance threshold, then at least part of the evaluation indicates that the user touch input is the intended touch input.

Example CC, the system of any one of Example W through Example BB, wherein the means evaluates the additional information to determine a difference between a direction of movement of the tool input and a direction of movement of the user touch input.

Example DD, the system of Example CC, wherein: if the difference is less than a direction difference threshold, then at least part of the evaluation indicates that the user touch input is the unintended touch input; and if the difference is greater than or equal to the direction difference threshold, then at least part of the evaluation indicates that the user touch input is the intended touch input.

Example EE, the system of any one of Example W through Example DD, wherein the means evaluates the additional information to determine a difference between a velocity of movement of the tool input and a velocity of movement of the user touch input.

Example FF, the system of Example EE, wherein: if the difference is less than a velocity difference threshold, then at least part of the evaluation indicates that the user touch input is the unintended touch input; and if the difference is greater than or equal to the velocity difference threshold, then at least part of the evaluation indicates that the user touch input is the intended touch input.

What is claimed is:
1. A device comprising:
a touch surface configured to receive a plurality of inputs;
one or more processors communicatively coupled to the touch surface; and
memory storing instructions that, when executed by the one or more processors, configure the one or more processors to:
implement a first classifier configured to evaluate information associated with a first input and a second input to determine:
whether the second input corresponds to an intended touch input or an unintended touch input; and an inter-arrival distance between a first position at which the first input arrives at the touch surface and a second position at which the second input arrives at the touch surface; and based at least on the first classifier being unable to determine whether the second input corresponds to an intended touch input or an unintended touch input, implement at least one subsequent classifier configured to evaluate additional information to determine whether the second input corresponds to an intended touch input or an unintended touch input, wherein the additional information evaluated is associated with movement of the first input relative to movement of the second input.

2. The device of claim 1, wherein:
the first input comprises touch input based on contact from a finger of a user; and
the second input is based on contact from another finger or a palm of a hand of the user.

3. The device of claim 1, wherein the first classifier evaluates the information to determine an inter-arrival time between a first time when the first input arrives at the touch surface and a second time when the second input arrives at the touch surface.

4. The device of claim 3, wherein:
if the inter-arrival time is less than an inter-arrival time threshold, then at least part of the evaluation of the first classifier indicates that the second input corresponds to the unintended touch input; and
if the inter-arrival time is greater than or equal to the inter-arrival time threshold, then at least part of the evaluation of the first classifier indicates that the second input corresponds to the intended touch input.

5. The device of claim 1, wherein:
if the inter-arrival distance is less than an inter-arrival distance threshold, then at least part of the evaluation of the first classifier indicates that the second input corresponds to the unintended touch input; and
if the inter-arrival distance is greater than or equal to the inter-arrival distance threshold, then at least part of the evaluation of the first classifier indicates that the second input corresponds to the intended touch input.

6. The device of claim 1, wherein the at least one subsequent classifier evaluates the additional information to determine a difference between a direction of movement of the first input and a direction of movement of the second input.

7. The device of claim 6, wherein:
if the difference is less than a direction difference threshold, then at least part of the evaluation of the at least one subsequent classifier indicates that the second input corresponds to the unintended touch input; and
if the difference is greater than or equal to the direction difference threshold, then at least part of the evaluation of the at least one subsequent classifier indicates that the second input corresponds to the intended touch input.

8. The device of claim 1, wherein the at least one subsequent classifier evaluates the additional information to determine a difference between a velocity of movement of the first input and a velocity of movement of the second input.

9. The device of claim 8, wherein:
if the difference is less than a velocity difference threshold, then at least part of the evaluation of the at least one subsequent classifier indicates that the second input corresponds to the unintended touch input; and if the difference is greater than or equal to the velocity difference threshold, then at least part of the evaluation of the at least one subsequent classifier indicates that the second input corresponds to the intended touch input.

10. A method comprising:
implementing a first classifier configured to evaluate information associated with a first input and a second input to determine:
whether the second input corresponds to an intended touch input or an unintended touch input; and
an inter-arrival distance between a first position at which the first input arrives at a touch surface and a second position at which the second input arrives at the touch surface; and
based at least on the first classifier being unable to determine whether the second input corresponds to an intended touch input or an unintended touch input, implementing at least one subsequent classifier configured to evaluate additional information to determine whether the second input corresponds to an intended touch input or an unintended touch input, wherein the additional information evaluated is associated with movement of the first input relative to movement of the second input.

11. The method of claim 10, wherein:
the first input comprises touch input based on contact from a finger of a user; and
the second input is based on contact from another finger or a palm of a hand of the user.

12. The method of claim 10, wherein the first classifier evaluates the information to determine an inter-arrival time between a first time when the first input arrives at the touch surface and a second time when the second input arrives at the touch surface.

13. The method of claim 12, wherein:
if the inter-arrival time is less than an inter-arrival time threshold, then at least part of the evaluation of the first classifier indicates that the second input corresponds to the unintended touch input; and
if the inter-arrival time is greater than or equal to the inter-arrival time threshold, then at least part of the evaluation of the first classifier indicates that the second input corresponds to the intended touch input.

14. The method of claim 10, wherein:
if the inter-arrival distance is less than an inter-arrival distance threshold, then at least part of the evaluation of the first classifier indicates that the second input corresponds to the unintended touch input; and
if the inter-arrival distance is greater than or equal to the inter-arrival distance threshold, then at least part of the evaluation of the first classifier indicates that the second input corresponds to the intended touch input.

15. The method of claim 10, wherein the at least one subsequent classifier evaluates the additional information to determine a difference between a direction of movement of the first input and a direction of movement of the second input.

16. The method of claim 15, wherein:
if the difference is less than a direction difference threshold, then at least part of the evaluation of the at least one subsequent classifier indicates that the second input corresponds to the unintended touch input; and
if the difference is greater than or equal to the direction difference threshold, then at least part of the evaluation of the at least one subsequent classifier indicates that the second input corresponds to the intended touch input.

17. The method of claim 10, wherein the at least one subsequent classifier evaluates the additional information to determine a difference between a velocity of movement of the first input and a velocity of movement of the second input.

18. The method of claim 17, wherein:
if the difference is less than a velocity difference threshold, then at least part of the evaluation of the at least one subsequent classifier indicates that the second input corresponds to the unintended touch input; and
if the difference is greater than or equal to the velocity difference threshold, then at least part of the evaluation of the at least one subsequent classifier indicates that the second input corresponds to the intended touch input.

19. One or more computer storage media storing instructions that, when executed by one or more processors, configure the one or more processors to:
implement a first classifier configured to evaluate information associated with a first input and a second input to determine:
whether the second input corresponds to an intended touch input or an unintended touch input; and
an inter-arrival distance between a first position at which the first input arrives at a touch surface and a second position at which the second input arrives at the touch surface; and
based at least on the first classifier being unable to determine whether the second input corresponds to an intended touch input or an unintended touch input, implement at least one subsequent classifier configured to evaluate additional information to determine whether the second input corresponds to an intended touch input or an unintended touch input, wherein the additional information evaluated is associated with movement of the first input relative to movement of the second input.

20. The one or more computer storage media of claim 19, wherein:
the first input comprises touch input based on contact from a finger of a user; and
the second input is based on contact from another finger or a palm of a hand of the user.

* * * * *